US012077001B2

(12) United States Patent
Yamada et al.

(10) Patent No.: US 12,077,001 B2
(45) Date of Patent: Sep. 3, 2024

(54) LIQUID EJECTION APPARATUS AND LIQUID EJECTION HEAD

(71) Applicant: CANON KABUSHIKI KAISHA, Tokyo (JP)

(72) Inventors: Kazuhiro Yamada, Kanagawa (JP); Yohei Nakamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/162,580

(22) Filed: Jan. 31, 2023

(65) Prior Publication Data

US 2023/0173820 A1 Jun. 8, 2023

Related U.S. Application Data

(62) Division of application No. 17/346,158, filed on Jun. 11, 2021, now Pat. No. 11,597,212.

(30) Foreign Application Priority Data

Jun. 19, 2020 (JP) ................................ 2020-106019

(51) Int. Cl.
*B41J 2/175* (2006.01)
*B41J 2/14* (2006.01)

(52) U.S. Cl.
CPC ....... *B41J 2/17596* (2013.01); *B41J 2/14032* (2013.01)

(58) Field of Classification Search
CPC ....... B41J 2/18; B41J 2/17596; B41J 2/14032
See application file for complete search history.

(56) References Cited

U.S. PATENT DOCUMENTS

| | | | | |
|---|---|---|---|---|
| 8,141,973 | B2 | 3/2012 | Hamazaki et al. | B41J 29/38 |
| 8,585,190 | B2 | 11/2013 | Hiratsuka et al. | 347/85 |
| 9,315,041 | B2 | 4/2016 | Moriguchi et al. | B41J 2/18 |
| 9,327,513 | B2 | 5/2016 | Moriguchi et al. | B41J 2/175 |

(Continued)

FOREIGN PATENT DOCUMENTS

| | | |
|---|---|---|
| CN | 107020820 | 8/2017 |
| CN | 109203716 | 1/2019 |

(Continued)

OTHER PUBLICATIONS

Extended European Search Report dated Nov. 23, 2021 in counterpart EP Application No. 21179794.9.

(Continued)

*Primary Examiner* — An H Do
(74) *Attorney, Agent, or Firm* — Venable LLP

(57) ABSTRACT

A liquid ejection apparatus includes a liquid storing unit capable of storing liquid, a liquid ejection unit including an ejection port that is capable of ejecting the liquid, and a pressure control unit that receives the liquid from the liquid storing unit and allows the liquid having a pressure controlled to be within a predetermined pressure range to be supplied to the liquid ejection unit. Additionally, the liquid ejection apparatus includes a first circulation unit that supplies the liquid having the pressure controlled by the pressure control unit to the ejection port while circulating the liquid between the liquid ejection unit and the pressure control unit, and a second circulation unit that circulates the liquid between the liquid storing unit and the pressure control unit.

20 Claims, 18 Drawing Sheets

(56) References Cited

U.S. PATENT DOCUMENTS

| | | | | |
|---|---|---|---|---|
| 9,358,803 | B2 | 6/2016 | Moriguchi et al. | B41J 2/18 |
| 9,649,849 | B2 | 5/2017 | Ohtsu et al. | B41J 2/17596 |
| 9,751,317 | B2 | 9/2017 | Nakamura et al. | B41J 2/16508 |
| 9,868,295 | B2 | 1/2018 | Kamei et al. | B41J 2/175 |
| 9,914,308 | B2 | 3/2018 | Yamada et al. | B41J 2/1404 |
| 9,925,791 | B2 | 3/2018 | Yamada | B41J 2/14024 |
| 9,975,340 | B2 | 5/2018 | Karita et al. | B41J 2/14072 |
| 9,981,464 | B2 | 5/2018 | Karita et al. | B41J 2/16526 |
| 10,005,287 | B2 | 6/2018 | Yamada et al. | B41J 2/1404 |
| 10,195,868 | B2 | 2/2019 | Yamada et al. | B41J 2/175 |
| 10,457,061 | B2 | 10/2019 | Sato et al. | B41J 2/17596 |
| 10,471,711 | B2 | 11/2019 | Karita et al. | B41J 2/1404 |
| 10,583,662 | B2 | 3/2020 | Yamada et al. | B41J 2/175 |
| 10,618,304 | B2 | 4/2020 | Ichinowatari | B41J 2/175 |
| 10,752,005 | B2 | 8/2020 | Shimizu | B41J 2/175 |
| 10,792,930 | B2 | 10/2020 | Yamada et al. | B41J 2/17596 |
| 11,285,730 | B2 | 3/2022 | Nakamura et al. | B41J 2/17596 |
| 11,597,212 | B2 * | 3/2023 | Yamada | B41J 2/18 |
| 2010/0231668 | A1 | 9/2010 | Ito | 347/92 |
| 2012/0007902 | A1 | 1/2012 | Hiratsuka et al. | B41J 2/195 |
| 2016/0368274 | A1 | 12/2016 | Ohtsu et al. | B41J 2/17593 |
| 2017/0087867 | A1 | 3/2017 | Sato et al. | B41J 2/175 |
| 2017/0197417 | A1 | 7/2017 | Karita et al. | B41J 2/18 |
| 2017/0197426 | A1 | 7/2017 | Nagai et al. | B41J 2/1404 |
| 2017/0320331 | A1 | 11/2017 | Alessi et al. | B41J 2/175 |
| 2019/0009554 | A1 | 1/2019 | Nakagawa | B41J 2/175 |
| 2019/0092011 | A1 | 3/2019 | Nakagawa et al. | B41J 2/14 |
| 2019/0092036 | A1 | 3/2019 | Yamada et al. | B41J 2/175 |
| 2019/0100024 | A1 | 4/2019 | Yamada et al. | B41J 2/14 |

FOREIGN PATENT DOCUMENTS

| | | |
|---|---|---|
| CN | 109572221 | 4/2019 |
| CN | 109572226 | 4/2019 |
| EP | 1886815 | 2/2008 |
| JP | 2009-154328 | 7/2009 |
| JP | 2016-141063 | 8/2016 |
| JP | 2017-007108 | 1/2017 |
| JP | 2019-064254 | 4/2019 |
| JP | 2019-142207 | 8/2019 |
| JP | 2019-177549 | 10/2019 |

OTHER PUBLICATIONS

Office Action dated Feb. 18, 2022 in counterpart India Application No. 202144026987, togetherwith English translation thereof.

Office Action dated Oct. 27, 2022 in counterpart Chinese Application No. 202110675636.6, together with English translation thereof.

Office Action dated May 7, 2024 in counterpart Japanese Application No. 2020-106019, together with English translation thereof.

* cited by examiner

LIQUID EJECTION APPARATUS AND LIQUID EJECTION HEAD

BACKGROUND OF THE INVENTION

This application is a division of application Ser. No. 17/346,158 filed Jun. 11, 2021, currently pending; and claims priority under 35 U.S.C. § 119 to Japan Application No. 2020-106019 filed in Japan on Jun. 19, 2020; and the contents of all of which are incorporated herein by reference as if set forth in full.

FIELD OF THE INVENTION

The present disclosure relates to a liquid ejection apparatus and a liquid ejection head.

Description of the Related Art

One of liquid ejection apparatuses that perform printing by using a liquid ejection head has been proposed to include a circulation mechanism that circulates liquid between the liquid ejection head and a liquid storing unit as a measure against problems such as thickening of the liquid, precipitation of color material, and stagnation of bubbles and foreign matters in the liquid ejection head and a liquid supply flow channel.

Japanese Patent Laid-Open No. 2017-7108 discloses a liquid ejection apparatus that circulates liquid in a liquid ejection head by means of a circulation pump mounted above the liquid ejection head.

SUMMARY OF THE INVENTION

The present disclosure includes: a liquid storing unit capable of storing liquid; a liquid ejection unit that includes an ejection port that is capable of ejecting the liquid; a pressure control unit that receives the liquid from the liquid storing unit and allows the liquid having a pressure controlled to be within a predetermined pressure range to be supplied to the liquid ejection unit; a first circulation unit that supplies the liquid having the pressure controlled by the pressure control unit to the ejection port while circulating the liquid between the liquid ejection unit and the pressure control unit; and a second circulation unit that circulates the liquid between the liquid storing unit and the pressure control unit.

Further features of the present invention will become apparent from the following description of exemplary embodiments with reference to the attached drawings.

DESCRIPTION OF THE EMBODIMENTS

Figure 1:
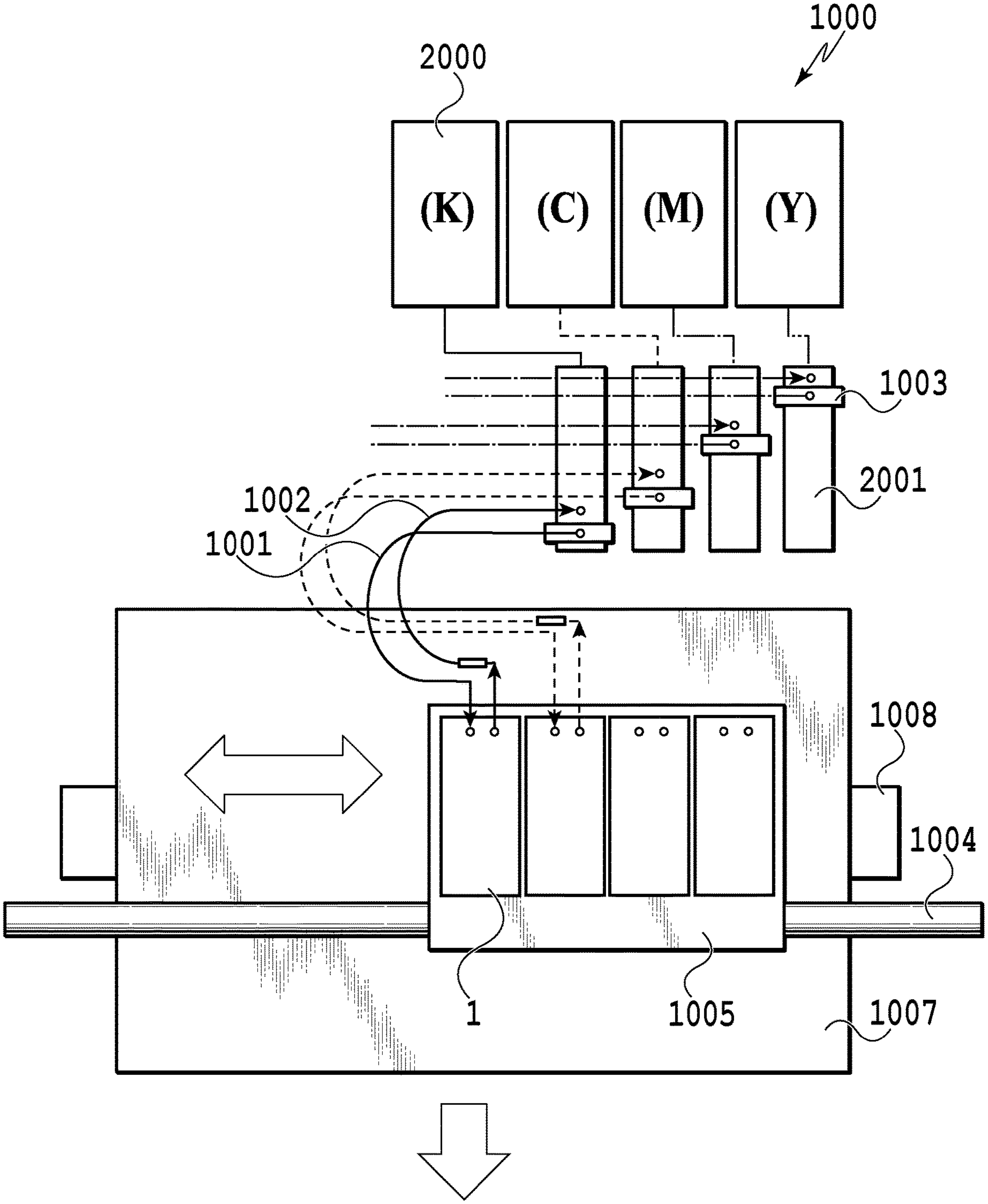
FIG. 1 is a schematic view illustrating a schematic configuration of a liquid ejection apparatus in an embodiment of the present invention.

In the configuration disclosed in Japanese Patent Laid-Open No. 2017-7108, it is possible to reduce thickening of the liquid, precipitation of color material, stagnation of bubbles and foreign matters, and the like in the liquid ejection head by circulating the liquid in the liquid ejection head by the circulation pump. However, the precipitation of color material and the stagnation of bubbles and foreign matters may still occur in a liquid flow channel from the liquid storing unit to the liquid ejection head. This causes a problem that there is required to perform a long period of time of suction recovery operation to suck and discharge the liquid from an ejection port of the liquid ejection head prior to start printing, and this causes a lot of waste inks and downtime. Such a problem is especially prominent in a liquid ejection apparatus for commercial printing, which uses an ink that easily precipitates such as a white ink.

Given the circumstances, a configuration in which the liquid in the liquid storing unit is circulated through a supply tube, a circulation pump, the liquid ejection head, a collection tube, and the liquid storing unit in this order may be considered. However, in this configuration, the collection tube is oscillated during the reciprocal scanning of the liquid ejection head, and a negative pressure variation occurs in the liquid ejection head. This causes instability in the ejection properties and the amount of ejected droplets of the liquid ejection head. Therefore, there is a risk of image quality degradation with streaks and unevenness generated on a printed image. Such effects on the image quality are more prominent as the scanning speed of the liquid ejection head is increased higher in order to improve the printing productivity.

Thus, it has been difficult for the conventional techniques to achieve both the reduction in waste inks and downtime and the printing properties of high-speed and high image quality.

Given the circumstances, an object of the present disclosure is to provide a liquid ejection apparatus and a liquid ejection head capable of achieving a productive liquid ejection operation while suppressing the precipitation of color material and the stagnation of foreign matters in a liquid flow channel.

Hereinafter, embodiments of the present invention are described with reference to the drawings. The scope of the present invention is determined according to the scope of claims, and the following descriptions are not intended to limit the scope of the present invention. Additionally, shapes, arrangements, and so on described below are not intended to limit the scope of the present invention. In the present embodiments, an inkjet printing apparatus is taken as an example of a liquid ejection apparatus that ejects liquid and performs printing on a printing medium. Therefore, in the following descriptions, the liquid ejected from the inkjet printing apparatus is referred to as an ink, and a liquid ejection head that ejects the ink is referred to as a printing head.

First Embodiment (Overall Configuration of Printing Apparatus)

FIG. 1 is a schematic view illustrating a schematic configuration of an inkjet printing apparatus 1000 (hereinafter, simply referred to as printing apparatus) according to an embodiment of the present invention. A printing head 1 is mounted on a carriage 1005 movably supported by a sliding shaft 1004. The carriage 1005 reciprocally moves above a platen 1008 along the sliding shaft 1004 by driving force of a not-illustrated carriage motor. A printing medium 1007 is conveyed to an upper surface of the platen 1008 by a not-illustrated conveyance roller. The printing head 1 ejects an ink while reciprocally moving above the printing medium 1007 supported on the upper surface of the platen 1008. The printing medium 1007 is intermittently conveyed by the conveyance roller with the reciprocal movement of the printing head 1. The printing head 1 is electrically connected to a not-illustrated control unit that transmits power, an ejection control signal, and the like to the printing head 1. The printing apparatus 1000 ejects the ink onto the printing medium 1007 in accordance with the operation of conveying the printing medium 1007 under control of the control unit. Such an operation of the printing head 1 allows for printing of an image on the printing medium 1007. The control unit in this embodiment includes a computer including a CPU, a ROM, a RAM, and so on. The CPU executes various kinds of processing such as computing and controlling while using data and the like stored in the RAM according to a control program stored in the ROM. The RAM is also used as a work area for the computing processing by the CPU.

The printing apparatus 1000 includes a main tank 2000, a sub tank (liquid storing unit) 2001 that stores the ink supplied from the main tank 2000, and a supply tube 1001 and a collection tube 1002 that allow for a fluid communication between the printing head 1 and the sub tank 2001. Such constituents are provided for each type of the inks (each ink color) used in the printing apparatus 1000. In this embodiment, four colors of inks that are black (Bk), cyan (C), magenta (M), and yellow (Y) are used, and the above-described constituents are provided for each of the inks. For the sake of simplifying the drawing, only the supply tube 1001 and the collection tube 1002 for two colors of inks out of the four colors of inks are illustrated in FIG. 1. A supply pump 1003 is connected to the supply tube 1001, and the ink is supplied from the sub tank 2001 to the printing head 1 by this supply pump 1003. A part of the ink supplied to the printing head 1 is refluxed to the sub tank 2001 by way of a differential pressure valve 2004 (see FIG. 2) and the collection tube 1002.

(Schematic Configuration of Printing Head)

Figure 2:
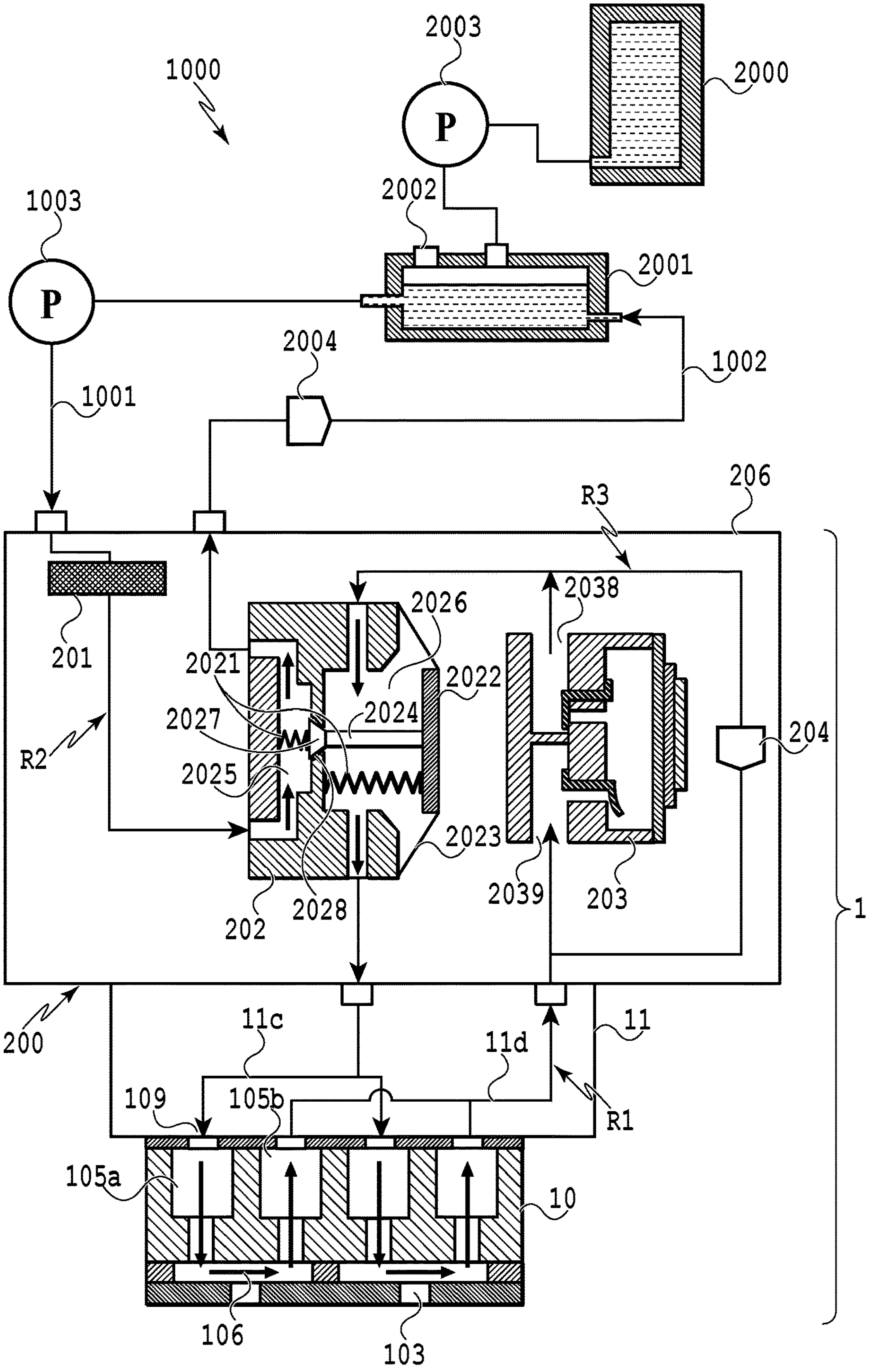
FIG. 2 is a schematic view illustrating a circulation channele of a liquid ejection apparatus in a first embodiment.
Figure 3:
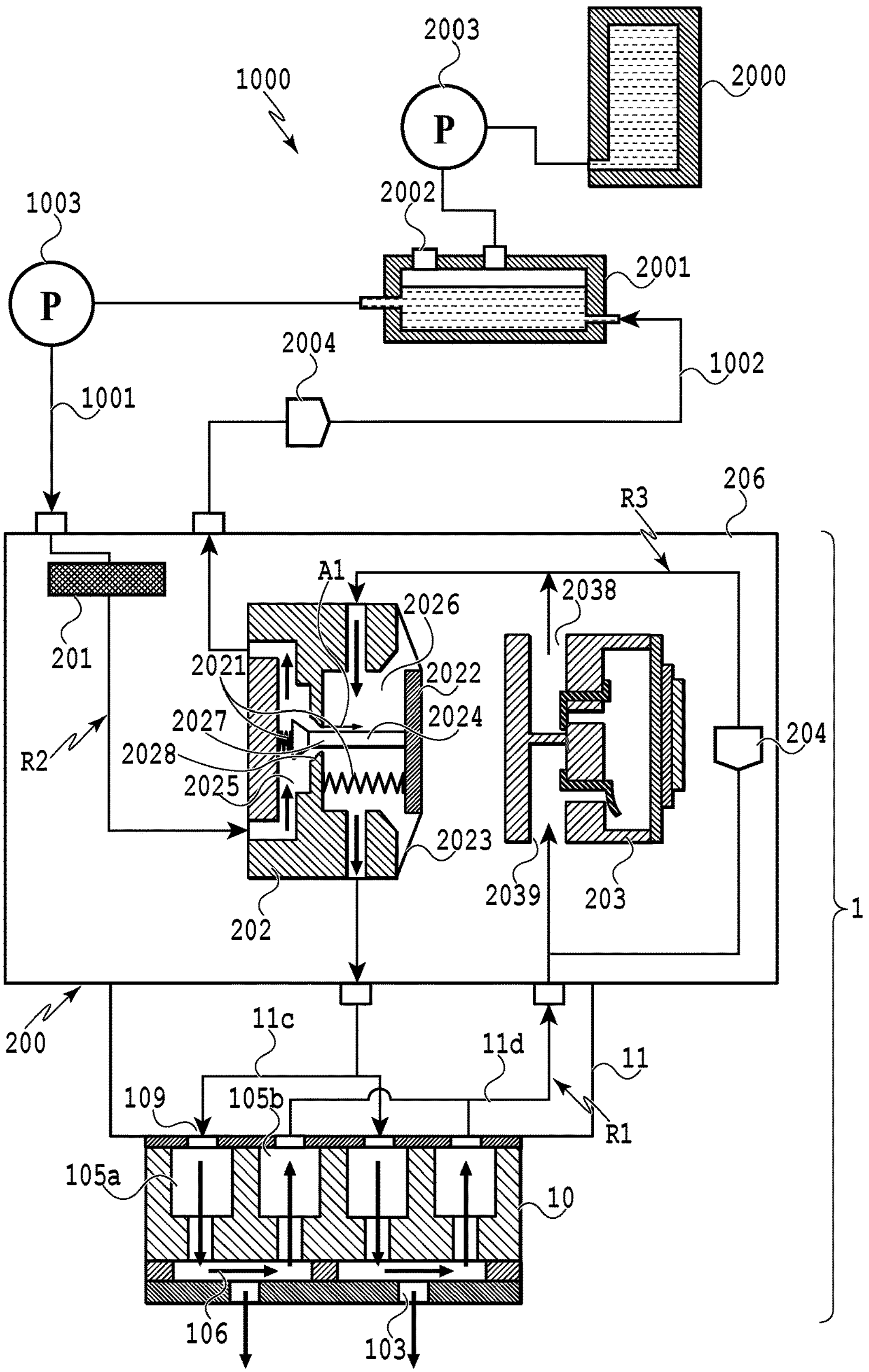
FIG. 3 is a schematic view illustrating a state of the circulation channele and a flow of ink in a case of printing.
Figure 4:
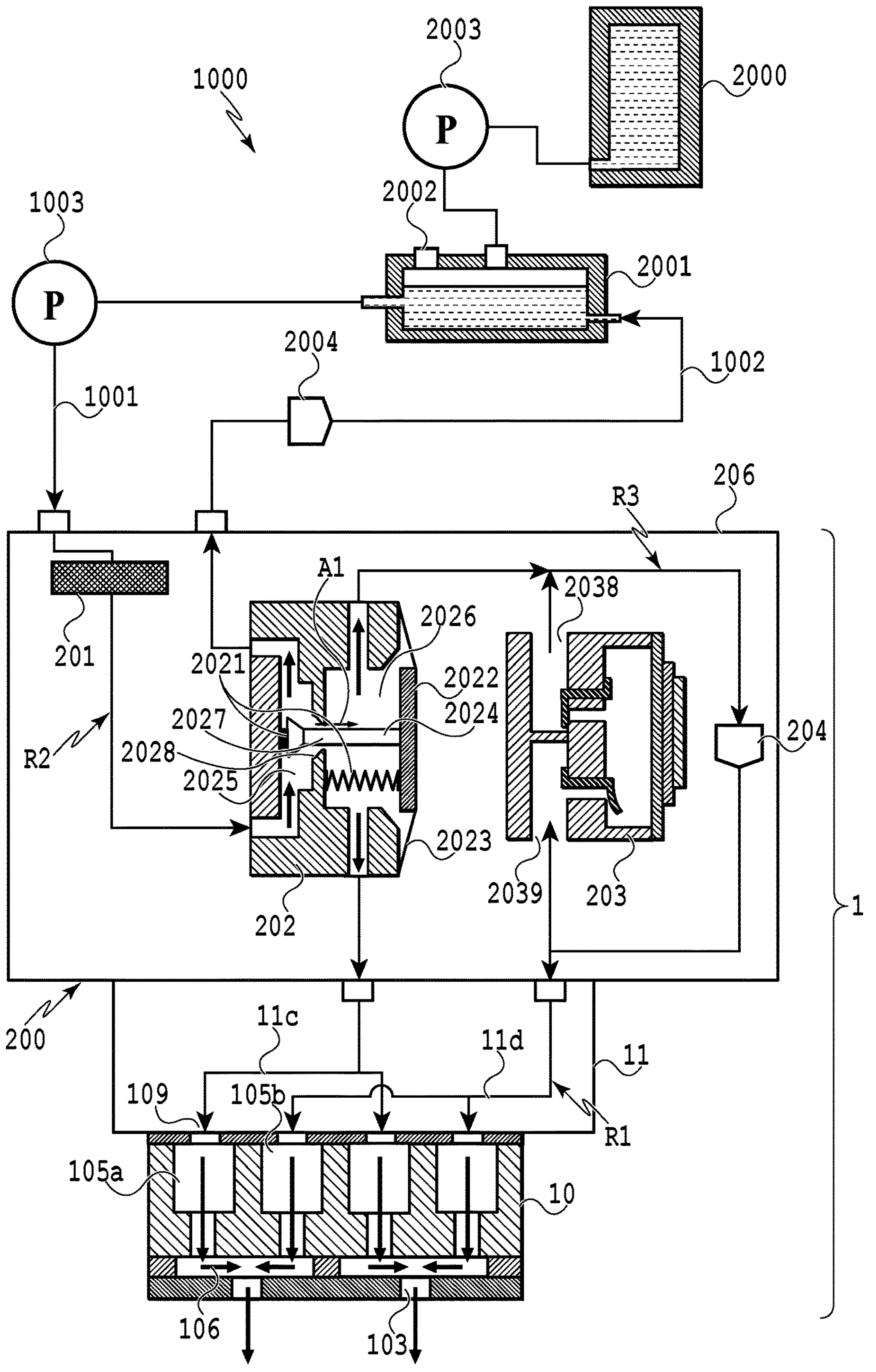
FIG. 4 is a schematic view illustrating a state of the circulation channele and a flow of ink in a case of high printing duty.

Next, a schematic configuration of the printing head 1 of the printing apparatus 1000 in this embodiment and an ink flow channel (liquid flow channel) formed in the printing head 1 are described. FIGS. 2 to 4 are schematic views illustrating an ink flow channel and a flow of ink for one color of ink of the printing apparatus 1000 in this embodiment, while FIG. 2 illustrates a printing standby state, FIG. 3 illustrates a printing operation state, and FIG. 4 illustrates a state where the printing operation is performed with high printing duty, respectively. For the sake of simplifying the illustrations in FIGS. 2 to 4, only a flow channel through which one color of ink flows is illustrated; however, actually, circulation channeles for multiple colors of inks are provided in each printing head 1 and a main body portion of the printing apparatus 1000.

First, a schematic configuration of the printing head 1 in this embodiment is described. The printing head 1 includes a printing element substrate 10 as a liquid ejection unit, a support member 11 supporting the printing element substrate 10, and a circulation unit 200 on which the support member 11 is fixed.

The circulation unit 200 serves as a pressure control mechanism that receives the ink from the sub tank 2001 as a liquid storing unit and supplies the ink having a pressure controlled to be within a predetermined pressure range to the printing element substrate 10 through the support member 11, and has the following configuration.

The circulation unit 200 includes a filter 201, a pressure regulator 202 as a pressure control unit, a head circulation pump 203, a negative pressure compensation valve 204, and a flow channel that allows the communication between these constituents. The pressure regulator 202 includes a supply chamber 2025, a negative pressure chamber 2026 capable of being in liquid communication with the supply chamber 2025 through an orifice 2028, and a pressure control valve 2027 that controls a flow resistance of the ink passing through the orifice 2028. The pressure control valve 2027 is provided to be able to move forward and backward with respect to the orifice 2028 and is biased by biasing force of a biasing member (biasing unit) 2021 including a spring in a direction in which the orifice 2028 is closed.

The supply chamber 2025 communicates with the supply tube 1001 and the collection tube 1002 through a flow channel formed in a body 206 forming a framework of the circulation unit 200. The negative pressure chamber 2026 communicates with a discharge port 2038 of the head circulation pump 203 through the flow channel formed in the body 206 and also communicates with a flow channel 11*c* formed in the support member 11. A side surface portion of the negative pressure chamber 2026 is formed of a flexible film 2023, and a pressure reception plate 2022 is fixed on an inner surface of the flexible film 2023. One end portion of a shaft 2024 provided on the pressure control valve 2027 is put in contact with the pressure reception plate 2022 by the biasing member 2021. The pressure reception plate 2022 is capable of being displaced with the flexible film according to a pressure variation in the negative pressure chamber 2026. This displacement of the pressure reception plate 2022 is transmitted to the pressure control valve 2027 through the shaft 2024. Consequently, the position of the pressure control valve 2027 is changed by means of net force of the pressing pressure from the pressure reception plate 2022 and the biasing force of the biasing member 2021, and thus the flow resistance of ink in the orifice 2028 is controlled. The filter 201 has a function of removing dust and air bubbles included in the ink supplied from the sub tank 2001 by the supply pump 1003.

The head circulation pump 203 includes the discharge port 2038 through which the liquid is discharged and a suction port 2039 through which the liquid is sucked. The discharge port 2038 communicates with the pressure regulator 202 as a pressure control unit through the flow channel, while the suction port 2039 communicates with a flow channel 11*d* formed in the support member 11. The head circulation pump 203 discharges the ink sucked through the suction port 2039 from the discharge port 2038, supplies the ink to the pressure regulator 202 through the flow channel, and thus serves as a driving source that forms a circulatory flow of the ink in a first circulation channele R1 described later.

The negative pressure compensation valve 204 is provided in a detour channele R3 that allows for a communication between the discharge port 2038 and the suction port 2039 of the head circulation pump 203. In a case where a differential pressure occurs between an upstream side and a downstream side of the negative pressure compensation valve 204, the negative pressure compensation valve 204 is opened and allows for the communication through the detour channele R3. This negative pressure compensation valve 204 has a function of suppressing an increase in a negative pressure that occurs in a downstream side of an ejection port in a case where images with high printing duty are printed continuously. The printing duty herein means a ratio of an amount of ink actually applied to a unit region of the printing medium and the maximum amount of ink applicable to the unit region, and the higher the printing duty, the greater the amount of ink applied to the unit region.

In the printing element substrate 10, ejection ports 103 through which the ink is ejected are formed, and also flow channels communicating with the ejection ports 103 are formed. These flow channels are each formed of a pressure chamber 106 communicating with a corresponding one of the ejection ports 103, a supply flow channel 105*a* and a collection flow channel 105*b* communicating with the pressure chamber 106, and the like. A structure of this printing element substrate 10 is described later in detail with reference to FIG. 8.

The flow channels 11*c* and 11*d* that allow for the communication between the printing element substrate 10 and the circulation unit 200 are formed in the support member 11. In the flow channel 11*c*, one end portion thereof communicates with the flow channel of the circulation unit 200 through a communication port 11*a*, while the other end portion communicates with the supply flow channel 105*a* through an opening 109 formed in the printing element substrate 10. On the other hand, in the flow channel 11*d*, one end portion thereof communicates with the flow channel of the circulation unit 200 through a communication port 11*b*, while the other end portion communicates with the collection flow channel 105*b* through the opening 109 formed in the printing element substrate 10.

With the printing head 1 having the above-described configuration, the first circulation channele R1 that circulates through the circulation unit 200, the support member 11, and the printing element substrate 10, and a second circulation channele R2 that circulates through the circulation unit 200 and the sub tank 2001 are formed in the printing apparatus 1000.

Hereinafter, flows of ink in the first circulation channele R1 and the second circulation channele R2 are described in detail.

(Flow of Ink in First Circulation Flow Channel)

First, a flow of ink in the first circulation channele R1 is described. With the head circulation pump (first pump) 203 driven, the ink is supplied from the discharge port 2038 of the head circulation pump 203 to the negative pressure chamber 2026 in the pressure regulator 202. The pressure regulator 202 is a so-called depressurizing type regulator mechanism and has a function of stabilizing the pressure in the negative pressure chamber 2026 within a certain range by the operations of the pressure control valve 2027 and the biasing member 2021 even in a case where the passing flow rate is varied. Details of the pressure control operation are described later.

The ink having the pressure adjusted to be within a predetermined slightly negative pressure range (preferably, −20 to −1000 mmAq) in the negative pressure chamber 2026 in the pressure regulator 202 passes through the negative pressure chamber 2026 and flows into the flow channel formed in the printing element substrate 10 by way of the flow channel 11*c* formed in the support member 11. This flow channel includes the supply flow channel 105*a*, the pressure chamber 106, the collection flow channel 105*b*, and the like, as described above. The ink that flows in the supply flow channel 105*a* from the flow channel 11*c* of the support member 11 passes through the pressure chamber 106 and the collection flow channel 105*b* as indicated by arrows in FIG. 2 and then returns again to the head circulation pump 203 through the flow channel 11*d* of the support member 11. A part of the ink that flows in the pressure chamber 106 is supplied to the corresponding one of the ejection ports 103.

Thus, a first circulatory flow (hereinafter, also referred to as an "in-head circulatory flow") that circulates between the pressure regulator 202 and the printing element substrate 10 is generated in the printing head 1. Therefore, the precipitation of the ink colorant in the first circulation channele R1 is suppressed. Additionally, since bubbles, a thickened ink, foreign matters, and the like can be discharged to the outside of the printing element substrate 10, a proper ejection operation can be performed without performing a preliminary ejection operation, and it is possible to achieve reliable printing.

In the printing head 1 illustrated in FIG. 2, the first circulatory flow formed by the ink (liquid) flowing through the first circulation channele R1 is intended to pass through the pressure chamber 106 of the printing element substrate 10. The ink flow rate in this case is set within a range in which a proper ejection operation can be achieved. In a general inkjet printing head, a flow channel near the ejection ports 103 is a significantly fine microchannel of several tens of μm; thus, a pressure drop is considerably great. For this reason, if a too great flow rate is set, the negative pressure in the ejection ports 103 becomes excessively great, and there may be a risk that a meniscus proper for the eject operation cannot be held. Particularly, in the printing element substrate 10 in which the ejection ports 103 are arranged at intervals with a density of 300 dpi or more, it is preferable to set the flow rate of ink flow to a flow rate equal to or less than an ejection flow rate in a case where the concurrent ejection from all the ejection ports 103 is performed. Additionally, it is also preferable to adopt a configuration in which a bypass flow channel is formed in the printing element substrate 10 or the support member 11 or in a boundary between the printing element substrate 10 and the support member 11 to add a channele capable of making a circulation without passing through the pressure chamber 106.

As long as a required flow rate and pressure for transferring liquid can be secured, the form of the head circulation pump 203 to be applied may be either of a positive displacement type and a negative displacement type. For example, a diaphragm pump, a tube pump, a piston pump, or the like is applicable as the positive displacement type. On the other hand, an axial-flow pump may be an example of an applicable negative displacement type pump. Also, a driving method can be preferably selected out of multiple methods such as motor driving, piezoelectric driving, and pneumatic driving. Taking into consideration the usage and cost of the pump that the pump is mounted on the printing head 1 and is reciprocally moved at high-speed and the cost of the pump, it is preferable to select a pump that is small and light with a smaller number of parts. It is more preferable if the pump has a small pressure pulsation. A piezoelectric type diaphragm pump may be an example of the preferable pump having the above characteristics. Otherwise, a pump that transfers the liquid by generating a fluid inertia effect by connecting pipe channels having a flow resistance difference to front and rear of a pump chamber in which an inner pressure is varied depending on a high frequency due to a piezoelectric element, bubbling caused by boiling, and the like may also be preferably applied. In this embodiment, the above-described head circulation pump 203 and first circulation channele R1 constitute a first circulation unit.

(Flow of Ink in Second Circulation Flow Channel)

Next, a flow of ink in the second circulation channele R2 formed in the printing head 1 is described. The ink in the replaceable main tank 2000 is supplied to the sub tank 2001 by a refilling pump 2003 and then supplied to the circulation unit 200 of the printing head 1 through the supply tube 1001. The sub tank 2001 includes an atmosphere communication port 2002 to be able to discharge air bubbles in the ink to the outside. Additionally, since the sub tank 2001 is capable of storing the ink, it is possible to continue the printing operation during the replacement of the main tank 2000 in the middle of the printing operation, and thus the convenience of the printing apparatus 1000 can be improved.

In a case where refilling of the ink consumed by ejecting (discharging) the ink from the ejection ports 103 of the printing head 1 during the printing operation, the suction recovery, and the like, the refilling pump 2003 transfers the ink from the main tank 2000 to the sub tank 2001. The sub tank 2001 is connected to the printing head 1 so as to be able to supply the printing head 1 with the ink through the supply tube 1001. Additionally, the sub tank 2001 is connected to the printing head 1 so as to be able to collect the ink from the printing head 1 through the collection tube 1002.

With the supply pump (second pump) 1003 driven, the ink in the sub tank 2001 passes through the supply tube 1001 and the filter 201 as indicated by arrows in FIG. 2 and then flows into the supply chamber 2025 of the pressure regulator 202. The ink that flows in the supply chamber 2025 is brought back to the sub tank 2001 by way of the collection tube 1002. Thus, the second circulation channele R2 that forms a second circulatory flow (hereinafter, also referred to as a "tank circulatory flow") that starts from the sub tank 2001 and returns again to the sub tank 2001 by way of the printing head 1 is formed in the printing apparatus 1000. Therefore, the precipitation of the ink colorant in the second circulation channele R2 including the sub tank 2001, the supply chamber 2025, the supply and collection tubes 1001 and 1002, and so on is suppressed. In this embodiment, the above-described supply pump 1003 and the second circulation channele R2 constitute a second circulation unit.

The differential pressure valve (second pressure control unit) 2004 is provided on the collection tube 1002. This differential pressure valve 2004 is opened only in a case where a differential pressure equal to or greater than a certain pressure occurs between an upstream side and a downstream side thereof so as to allow the ink to flow through the collection tube 1002. Since the sub tank 2001 is connected downstream of the differential pressure valve 2004, a hydraulic head pressure with respect to the sub tank 2001 is applied downstream of the differential pressure valve 2004. The upstream side of the differential pressure valve 2004 is held at a pressure equal to or greater than a certain pressure by the pressure regulator 202. This pressure value on the upstream side of the differential pressure valve 2004 is not necessarily a positive pressure and may be a negative pressure as long as the pressure is equal to or more than the minimum pressure at which it is possible to perform normal pressure control with the design of the pressure regulator 202. The differential pressure valve 2004 may be attached in a position on a downstream side of the collection tube 1002, that is, near the sub tank 2001. In order to further reduce a pressure variation caused by oscillation of the ink due to sliding of the collection tube 1002, it is preferable to provide the differential pressure valve 2004 in a position near the printing head 1. It is more preferable for suppressing the pressure variation to adopt a configuration in which the differential pressure valve 2004 is inserted into a joint needle coupling the printing head 1 and the collection tube 1002.

In a state illustrated in FIG. 2, the printing is not performed, and thus the pressure control valve 2027 in the pressure regulator 202 is closed. Consequently, the ink supplied to the pressure regulator 202 passes through the supply chamber 2025 at a pressure equal to or greater than a certain pressure and is refluxed to the sub tank 2001 through the collection tube 1002.

As described above, in this embodiment, in the printing standby state, the two circulatory flows are formed with the pressure control valve 2027 in the pressure regulator 202 serving as a pressure boundary.

Specifically, the following two circulatory flows are formed:

1) the first circulatory flow generated between the pressure regulator 202 and the printing element substrate 10; and
2) the second circulatory flow generated between the pressure regulator 202 and the sub tank 2001.

Therefore, even with the ink that easily precipitates such as a white ink, the change in the density due to the precipitation of the color material is suppressed. Consequently, in this embodiment, the printing apparatus 1000 does not need to perform the suction recovery operation when restarting the printing, and thus no waste inks and downtime are caused.

Since the pressure variation due to the ink oscillation that occurs in the supply tube 1001 and the collection tube 1002 during the printing operation is sufficiently reduced by the action of the regulator, the pressure variation is never transmitted to the first circulatory flow side. Therefore, the ejection properties of the printing head 1 is stable even in a case where the reciprocal scanning speed of the printing head 1 is increased and the printing is performed at high-speed, and thus a high quality image with less streaks and unevenness can be printed.

Next, a state of a flow of ink in a case where the printing operation is started is described. FIG. 3 is a schematic view illustrating a state of a flow of one color of ink in the printing apparatus 1000 in this embodiment. Once the amount of ink is decreased due to the ejection, the negative pressure in the negative pressure chamber 2026 is increased, and the pressure reception plate 2022 of the pressure regulator 202 is moved leftward in FIG. 3. In association with the movement of the pressure reception plate 2022, the pressure control valve 2027 is moved leftward away from the orifice 2028. As a result, the ink of an amount corresponding to an amount of the ejected ink flows into the negative pressure chamber 2026 from the supply chamber 2025 as indicated by an arrow A1, and thus the first circulatory flow is refilled with the ink. During this process, the pressure in the negative pressure chamber 2026 is held at a predetermined slightly negative pressure by the action of the biasing member 2021, and the first circulatory flow is also maintained. Therefore, no precipitation of the color material occurs even in the ejection ports 103 in a non-ejection state, and the ejection ports 103 can be maintained in a state capable of ejecting anytime without performing the preliminary ejection operation. Since the second circulatory flow is also continuously maintained in this process, the precipitation of the color material is suppressed also between the sub tank 2001 and the printing head 1. Consequently, an ink having a constantly stable density can be supplied to the printing head 1.

In order to achieve the high-speed printing, the printing head 1 needs to perform the reciprocal scanning at high-speed, and the ink oscillation in the supply tube 1001 and/or the collection tube 1002 is accordingly increased. However, in this embodiment, the pressure variation transmitted to the pressure control valve 2027 due to the oscillation of the ink is transmitted to the negative pressure chamber in an attenuated state. That is, as can be seen in FIG. 3, the pressure variation transmitted to the pressure control valve 2027 is attenuated according to a ratio (S1/S2) of a pressure reception area (S1) of the pressure control valve 2027 and a pressure reception area (S2) of the pressure reception plate 2022, and the thus-attenuated pressure variation is transmitted to the negative pressure chamber 2026. Therefore, the negative pressure variation can be sufficiently reduced in the first circulatory flow, and thus the amount of ejected droplets and the ejection properties can be stabilized. Consequently, printing with high image quality at high-speed with no streaks and unevenness can be executed.

Once the printing operation is stopped, the pressure control valve 2027 is closed again, and the two flows of the second circulatory flow and the first circulatory flow are separated from each other autonomously; however, since the circulatory flows still remain, respectively, the precipitation of the color material is suppressed.

FIG. 4 is a diagram illustrating a state where the printing is performed with high duty. As described above, in terms of suppressing excessive applying of the negative pressure to the ejection ports 103, it is preferable to set the flow rate of the ink passing through the printing element substrate 10 in the non-printing state to be lower than the ejection flow rate during the concurrent ejection of the ink from all the ejection ports (during the complete ejection). In the case where the printing operation is performed with high printing duty by the complete ejection, the pressure chamber 106 is refilled with the ink not only from the supply flow channel **105*a* but also from the collection flow channel 105*b* as indicated by arrows illustrated in the pressure chamber 106 in FIG. 4. Even in this state, no backflow occurs because a piezoelectric type diaphragm pump that is a positive displacement type is used as the head circulation pump 203 in this example. Therefore, if many ejection ports 103 of the printing element substrate 10 continue the printing with high printing duty, a pressure in the collection flow channel 105*b* is reduced, and finally the refilling of the ejection ports 103 with the ink becomes insufficient. In this case, there is a possibility that the volume of the ejected droplets becomes smaller than the design, and the image may be faded or faint. Additionally, if there are few ejection ports 103 in non-printing state, the passing flow rate of the ink in those ejection ports 103** is increased extremely, and the negative pressure is increased and the temperature is abnormally decreased. This affects on the ink ejection, and the image quality is degraded.

In order to avoid such an image quality degradation in a case where the printing with high printing duty is performed, the negative pressure compensation valve (negative pressure compensation unit) 204 is provided in the circulation unit 200 in this embodiment. The negative pressure compensation valve 204 is designed to be opened when a differential pressure between an upstream side and a downstream side thereof becomes equal to or more than a predetermined differential pressure. If the pressure in the collection flow channel **105*b* is excessively reduced because of the continuous printing with high printing duty, the negative pressure compensation valve 204 is opened to supply the ink from the pressure regulator 202**, and thus the excessive increase in the negative pressure is suppressed. Therefore, it is possible to perform stable ink ejection even in the case where the printing with high printing duty is performed, and a high quality image can be formed.

Referring back to the printing standby state in FIG. 2, it can be seen that no circulatory flows are generated in the negative pressure compensation valve 204 and the detour channele R3. In order to suppress the precipitation of the ink colorant in these portions, it is preferable to cause the flow rate in the head circulation pump 203 in the printing standby state to be greater than that during the printing to reduce the pressure in the suction port 2039 of the head circulation pump 203. It is preferable because, in this way, the negative pressure compensation valve 204 can be opened, and thus a flow of ink that suppresses the precipitation of the color material in these portions can be generated. There is also a possibility that this operation may cause a reduction in the pressure in the pressure chamber 106 of the printing element substrate 10, and this pressure reduction may not be favorable for the designed ejection driving; however, as long as meniscuses in the ejection ports 103 are maintained, the printing standby state remains, and therefore it is no problem.

This embodiment includes the first circulation channele R1 through which the ink circulates between the printing element substrate 10 and the negative pressure chamber 2026 of the pressure regulator 202 and the second circulation channele R2 through which the ink circulates between the supply chamber 2025 of the pressure regulator 202 and the sub tank 2001. With this configuration, the pressure control valve 2027 that allows for the communication and the block between the negative pressure chamber 2026 and the supply chamber 2025 is opened and closed according to the ejected amount so as to hold the negative pressure chamber 2026 at a certain negative pressure even during the high-speed printing, and thus the pressure variation due to the oscillation of the tube during the scanning of the printing head 1 can be sufficiently suppressed. Therefore, it is possible to achieve the printing with high image quality at high-speed. On the other hand, since the pressure control valve 2027 is closed autonomously in the printing standby state, the first circulation channele R1 in the head in which the negative pressure is maintained and the second circulation channele R2 in which the pressure is isolated from that in the first circulation channele R1 are formed autonomously, and the circulations are continued in the channeles without stopping, respectively. Therefore, even with the ink that easily precipitates such as a white ink, the conventionally-performed recovery operation by sucking an enormous amount of ink is no more necessary.

Second Embodiment

Figure 5:
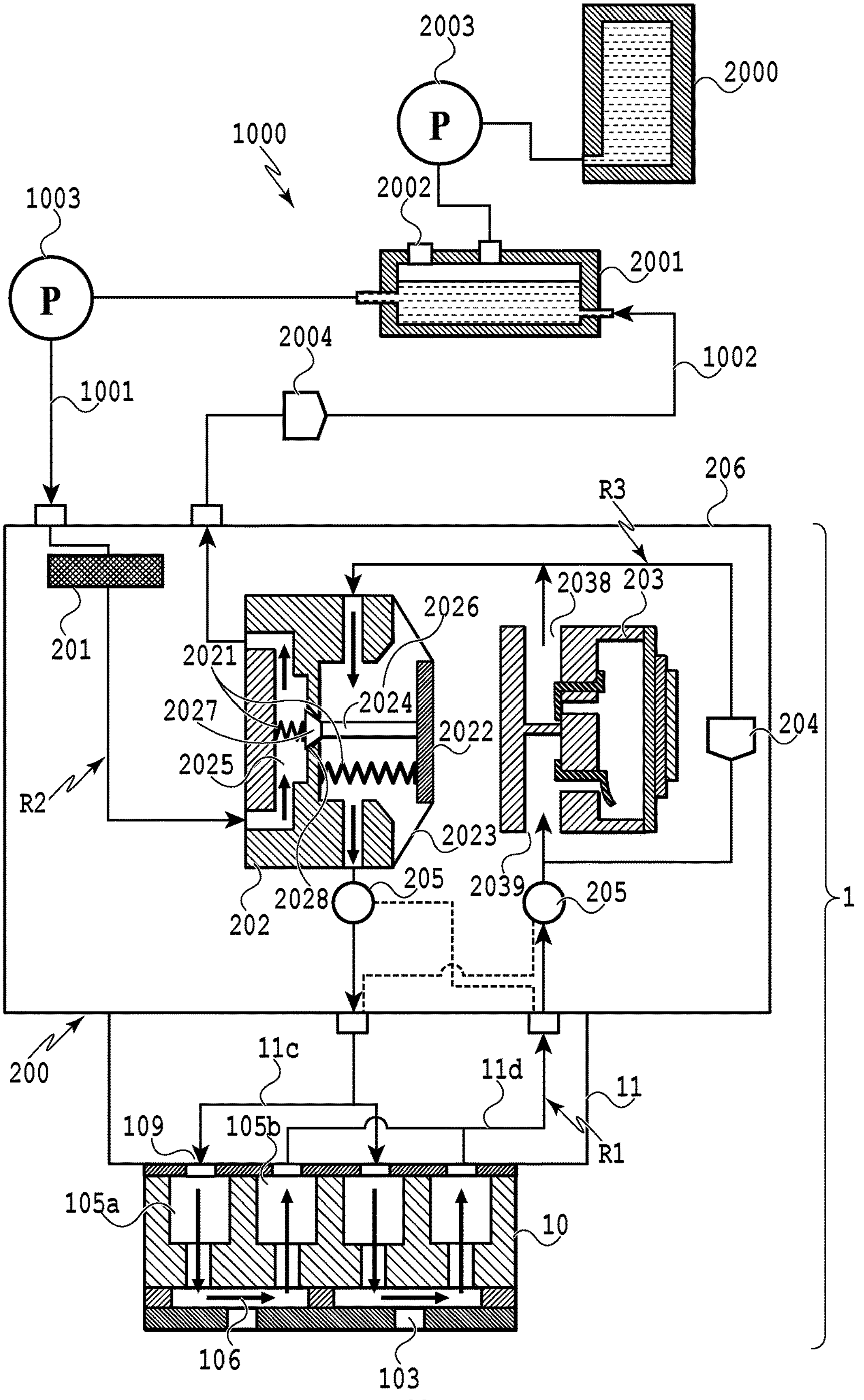
FIG. 5 is a schematic view illustrating a circulation channele of a liquid ejection apparatus in a second embodiment.
Figure 6:
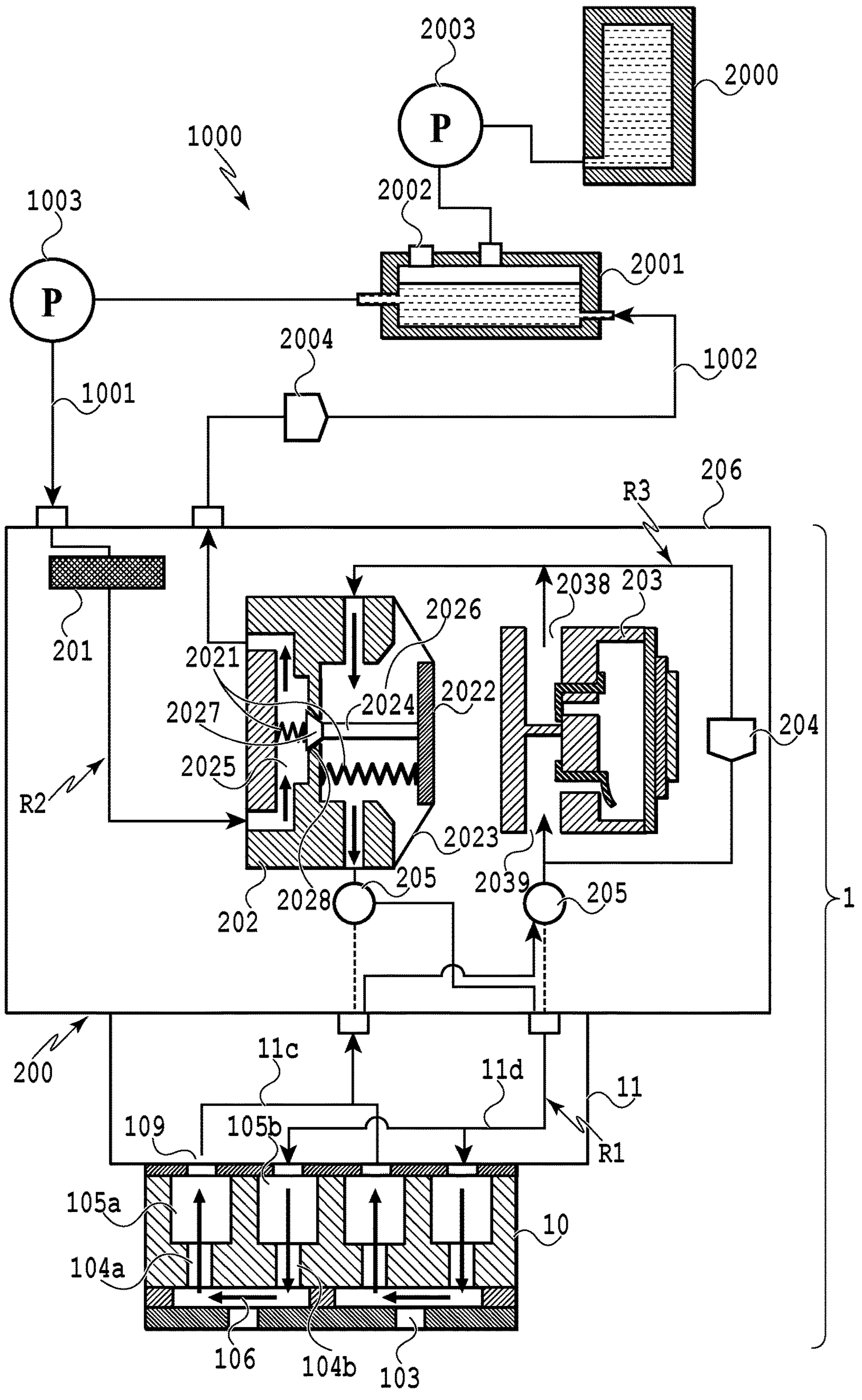
FIG. 6 is a schematic view illustrating a state where a flow of ink is inverted in a liquid ejection head.

A fluid channele corresponding to one color of ink in the printing apparatus 1000 in a second embodiment of the present invention is illustrated in FIGS. 5 and 6. The second embodiment is different from the first embodiment in that the second embodiment includes two switching valves (switching units) 205 in the circulation unit 200 to switch flow directions of the ink in the printing element substrate 10.

In this embodiment, three-way valves are used as the switching valves 205; however, it is not limited thereto. The switching valves 205 may have a configuration other than that illustrated in FIGS. 5 and 6 as long as it has a function of inverting a flow in the printing element substrate 10, or particularly a flow in the pressure chamber 106. For example, it is possible to apply a five-way valve using a sliding valve. It should be taken into consideration in a case of using the switching valves 205 that the operation of the pressure control valve 2027 during the switching of the switching valves 205 causes the pressure in the printing head 1 to exceed a negative pressure range in which the menisces in the ejection ports 103 can be maintained. To this end, it is preferable to design a stroke in the opening and closing operation of the pressure control valve 2027 significantly short or to use a "rocker valve" type. A specific structure of the rocker valve type is described later.

As illustrated in FIG. 5, among the two switching valve 205, one port of the switching valve 205 on the left side in FIG. 5 communicates with the pressure regulator 202, while one port of the switching valve 205 on the right side communicates with the head circulation pump 203. The remaining two ports of the two switching valves 205 both selectively communicate with the two flow channels 11*c* and 11*d* of the support member 11. Specifically, in the state illustrated in FIG. 5, the switching valve 205 on the left side communicates with the flow channel 11*c*, and the communication with the flow channel 11*d* is blocked. Consequently, in the state illustrated in FIG. 5, the switching valve on the left side supplies the ink flowing out from the negative pressure chamber 2026 of the pressure regulator 202 to the flow channel 11*c* in the support member 11, while the switching valve 205 on the right side collects the ink from the flow channel 11*d* in the support member 11 to the head circulation pump 203.

FIG. 6 illustrates a state where the communication state between the switching valves 205 and the flow channels 11*c* and 11*d* is switched from the state illustrated in FIG. 5. In this state, the switching valve 205 on the left side communicates with the flow channel 11*d*, and the communication with the flow channel 11*c* is blocked. Meanwhile, the switching valve 205 on the right side communicates with the flow channel 11*c*, and the communication with the flow channel 11*d* is blocked. In this case, the switching valve 205 on the left side supplies the ink flowing out from the negative pressure chamber 2026 of the pressure regulator 202 to the flow channel 11*d* in the support member 11, while the switching valve 205 on the right side collects the ink from the flow channel 11*c* in the support member 11 to the head circulation pump 203. In FIGS. 5 and 6, a broken line arrow indicates a state where no ink flows through the flow channel (blocked state).

Thus, in the second embodiment, it is possible to switch the flow directions of the ink in the pressure chamber 106 of the printing head 1 to be inverted. This process is intended to obtain the following result. Usually, the dimension of the width of flow channels (independent communication holes 104*a* and 104*b*) directly communicating with the pressure chamber 106 of the printing element substrate 10 is several tens of μm, and it is narrower than the supply flow channel 105*a* and the collection flow channel 105*b*. For this reason, in a case where bubbles are generated in or flow into the supply flow channel 105*a*, it is difficult to discharge the bubbles by way of the pressure chamber 106 if the ink is circulated like only the state illustrated in FIG. 5. In this case, inverting of the flow directions of the ink in the pressure chamber 106 as illustrated in FIG. 6 makes it possible to discharge the bubbles in the supply flow channel 105*a* to the outside of the printing element substrate 10.

Since the negative pressure in the printing head 1 is maintained in a proper range by the pressure regulator 202 in both the in-head circulation states illustrated in FIGS. 5 and 6, it is possible to start the printing operation while the in-head circulations are continued. Thus, in this embodiment, in addition to the functions and effects achieved by the first embodiment, the printing operation can be continued while discharging bubbles and foreign matters to the outside of the printing element substrate 10. Therefore, it is possible to further reduce downtime of the printing apparatus 1000.

Modification of Second Embodiment

Figure 7:
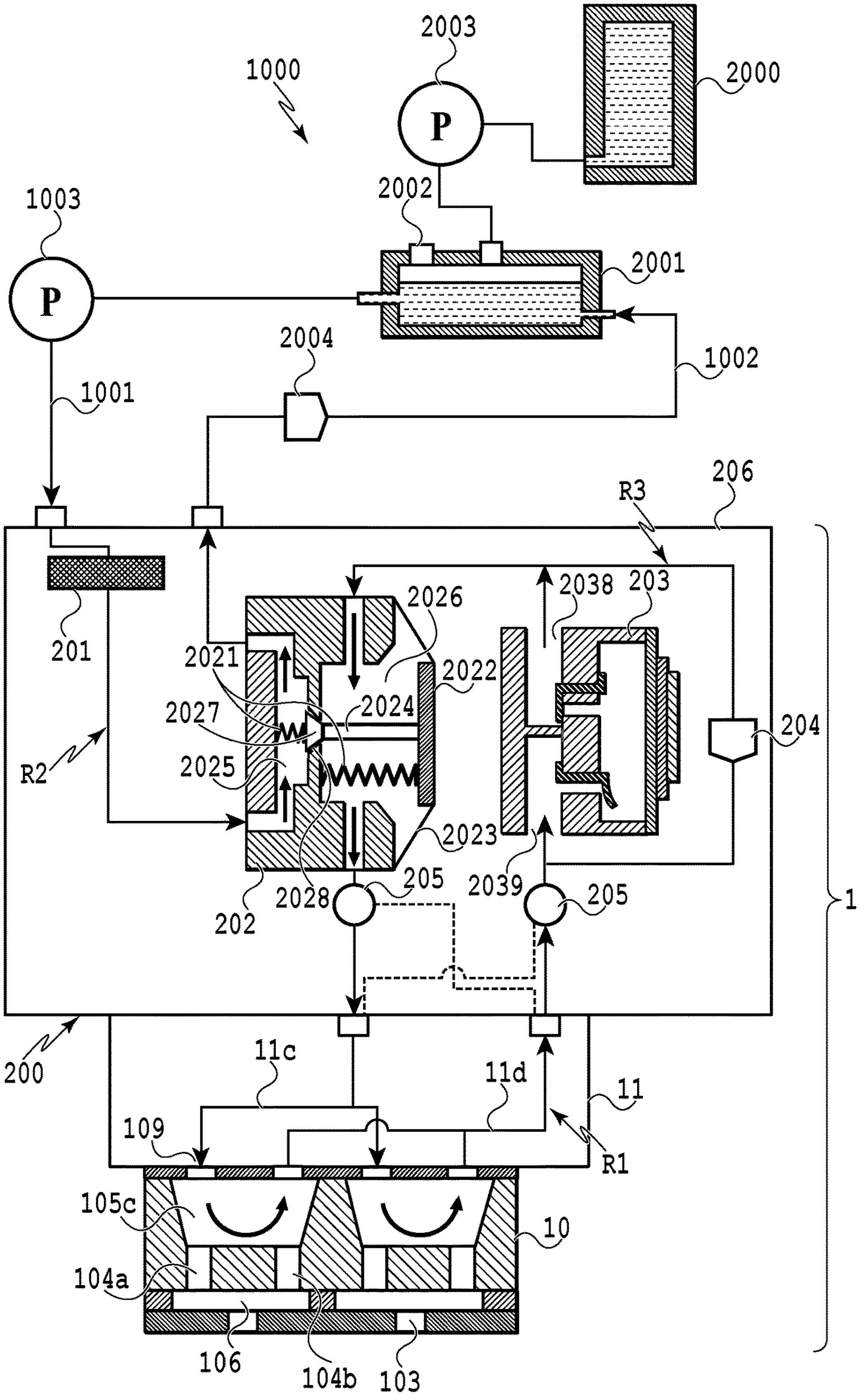
FIG. 7 is a schematic view illustrating a modification of the second embodiment.

Next, a modification of the above-described second embodiment is described with reference to FIG. 7. In the second embodiment, as illustrated in FIG. 6, the supply flow channel 105*a* and the collection flow channel 105*b* independently communicate with the independent communication holes 104*a* and 104*b* communicating with the pressure chamber 106, respectively. In contrast, this modification has a configuration in which a single flow channel 105*c* communicates with the independent communication holes 104*a* and 104*b*.

Therefore, in this modification, although a part of the ink supplied from the support member 11 is supplied to the pressure chamber 106 through the independent communication holes 104*a* and 104*b*, most of the ink that flows in the flow channel 105*c* flows into the support member 11 again by way of the flow channel 105*c* without passing through the pressure chamber 106. In other words, in this modification, a first circulation channele that does not pass through the pressure chamber 106 is formed.

With this configuration, since the in-head circulatory flow does not pass through small portions like the pressure chamber 106 and the independent communication holes 104*a* and 104*b* communicating with the pressure chamber 106, the flow resistance of the ink is reduced, and it is possible to avoid the precipitation of the color material more reliably in the printing head 1. Additionally, bubbles and foreign matters included in the ink can be discharged to the outside of the printing element substrate 10 more reliably.

Since no flow passing through the pressure chamber 106 is formed in the printing standby state, there is a possibility that the precipitation of the colorant occurs in the independent communication holes 104*a* and 104*b* communicating with the pressure chamber 106. However, since these portions have a small dimension as described above, it is possible to remove the color material precipitating in these portions by a tiny amount of preliminary ejection operation.

Additionally, in this modification, since there is no circulatory flow passing through the pressure chamber 106, the moisture evaporation in the ejection ports 103 is suppressed. Therefore, even in a case where the in-head circulations are continued for a long period of time, the condensation of the entire ink is suppressed, and thus the number of times of performing processing to discharge the condensed ink can be reduced, and waste inks can be further reduced.

Hereinafter, configurations of the constituents in the above-described embodiments are more specifically described. The descriptions are given based on the configuration of the above-described second embodiment, and a configuration including the switching valves 205 is described while other configurations are similar to the configurations of the constituents in the first embodiment.

(Printing Element Substrate)

Figure 8:
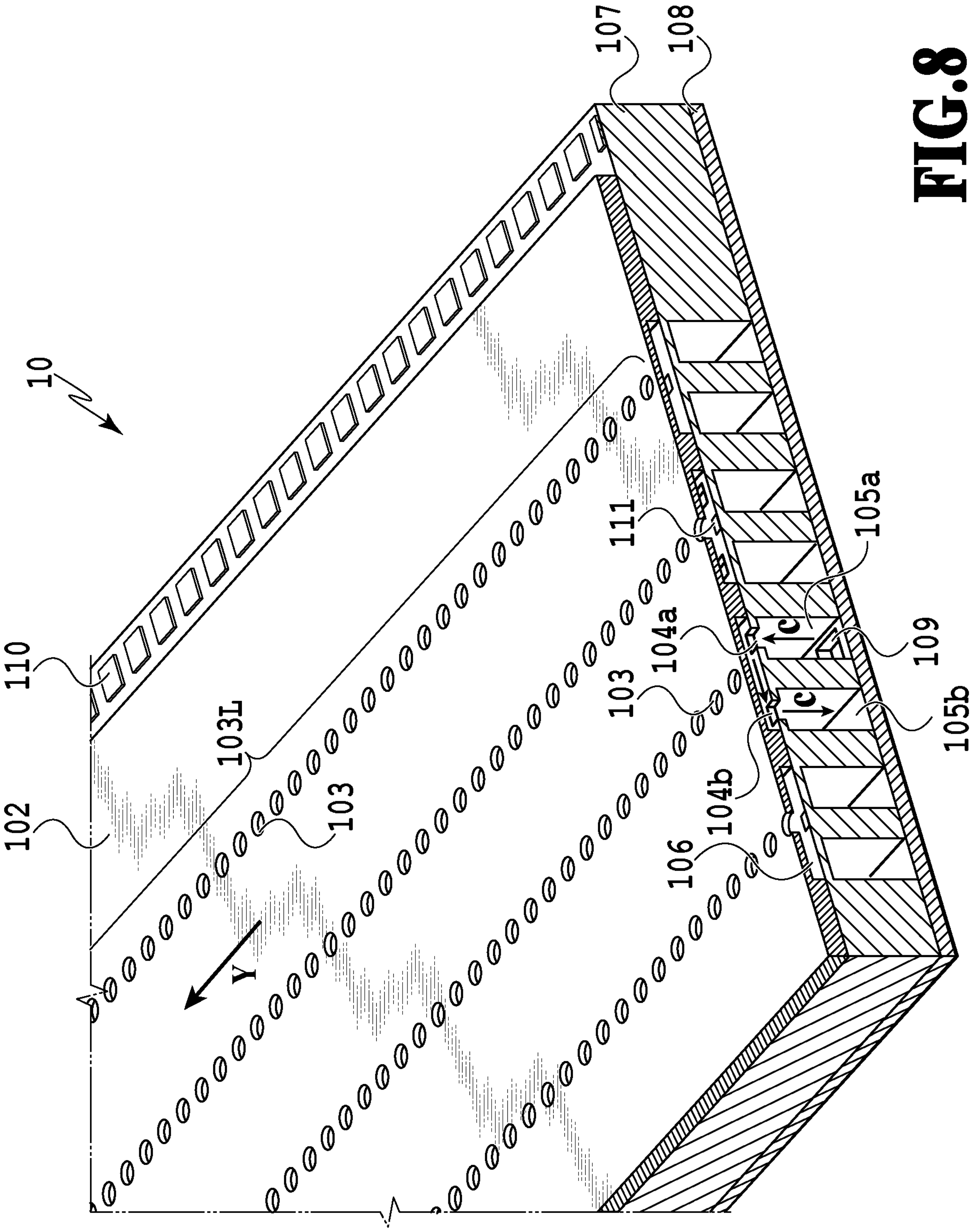
FIG. 8 is a cross-sectional perspective view illustrating a printing element substrate.

A configuration of the printing element substrate 10 in this embodiment is described. FIG. 8 is a perspective view illustrating a cross section that crosses in a longitudinal direction (Y direction) of an ejection port row 103L including the multiple ejection ports 103 formed in the printing element substrate 10. In the printing element substrate 10, a substrate 107 made of Si and an ejection port formation member 102 formed of photosensitive resin are laminated. A lid member 108 is joined to a back surface of the substrate 107. A printing element 111 is formed on one side of the substrate 107 (upper surface side in FIG. 8), and grooves constituting the supply flow channel 105*a* and the collection flow channel 105*b* extending along the ejection port row are formed on the opposite side (lower surface side in FIG. 8). Four ejection port rows are formed on the ejection port formation member 102 of the printing element substrate 10.

The printing element 111, which is a heating element for bubbling the liquid by heat energy, is arranged in a position corresponding to each of the ejection ports 103. The printing element 111 is electrically connected with a terminal 110 by an electric wiring (not illustrated) provided inside the substrate 107. The printing element 111 produces heat based on a pulse signal inputted from the control unit of the printing apparatus 1000 through an electric wiring substrate and a flexible wiring substrate and boils the liquid filled in the pressure chamber 106. The liquid is ejected from the ejection ports 103 by force of the bubbling due to the boiling.

The supply flow channel 105*a* and the collection flow channel 105*b* are flow channels extending in a direction of the row of the ejection ports 103 provided on the printing element substrate 10 and communicate with the pressure chamber 106 through the independent communication hole 104*a* and the independent communication hole 104*b*, respectively. Multiple openings 109 are provided in the lid member 108. In this embodiment, three openings 109 for one supply flow channel 105*a* and two openings 109 for one collection flow channel 105*b* are provided at predetermined intervals in the lid member 108, respectively. Each of the openings 109 communicates with the flow channel in the support member 11 as illustrated in FIG. 5. The lid member 108 has a function as a lid that forms a part of walls of the supply flow channel 105*a* and the collection flow channel 105*b*. It is preferable that the lid member 108 has a sufficient corrosion resistance to the liquid (ink). In terms of suppressing color mixing, the opening shape and the opening position of the openings 109 are required to be accurate. The lid member 108 is for converting a pitch from the flow channels of the printing element substrate 10 to the flow channels of the support member 11 by the openings 109, and considering the pressure loss, it is desirable that the thickness of the lid member 108 is thin. Therefore, it is preferable that photosensitive resin material or a silicon sheet is used as the material of the lid member 108, and the openings 109 are provided by a photolithography process.

Next, a flow of liquid in the printing element substrate 10 is described. The supply flow channel 105*a* and the collection flow channel 105*b* formed of the substrate 107 and the lid member 108 are connected with the flow channels of the support member 11, respectively, as illustrated in FIG. 5. With the head circulation pump 203 driven, the liquid in the supply flow channel 105*a* flows into the collection flow channel 105*b* by way of the independent communication hole 104*a*, the pressure chamber 106, and the independent communication hole 104*b* (a flow indicated by arrows C in FIG. 8). With this flow, the precipitation of the ink in the printing element substrate 10 can be suppressed in the pressure chamber 106 in which the ejection operation is paused. At the same time, a thickened ink, bubbles, foreign matters, and the like generated due to the evaporation from the ejection ports 103 can be discharged to the collection flow channel 105*b*.

The ink collected to the collection flow channel 105*b* returns to the head circulation pump 203 through the openings 109 of the lid member 108 and the flow channels 11*c* and 11*d* of the support member 11 (see FIGS. 5 and 6). In this process, in a case where the switching valves 205 are switched as illustrated in FIG. 6, the flow direction in the printing element substrate 10 flows in a direction opposite of the direction of the arrows C in FIG. 8. Even in the case where the circulatory flow in the direction of the arrows C is generated, bubbles, foreign matters, and the like larger than the independent communication hole 104*a* stagnate in the supply flow channel 105*a*. However, with the circulatory flow in the opposite direction generated as illustrated in FIG. 6, large bubbles and foreign matters stagnating in the supply flow channel 105*a* can be discharged to the outside of the printing element substrate 10 through the openings (Circulation Unit)

Figure 9A:
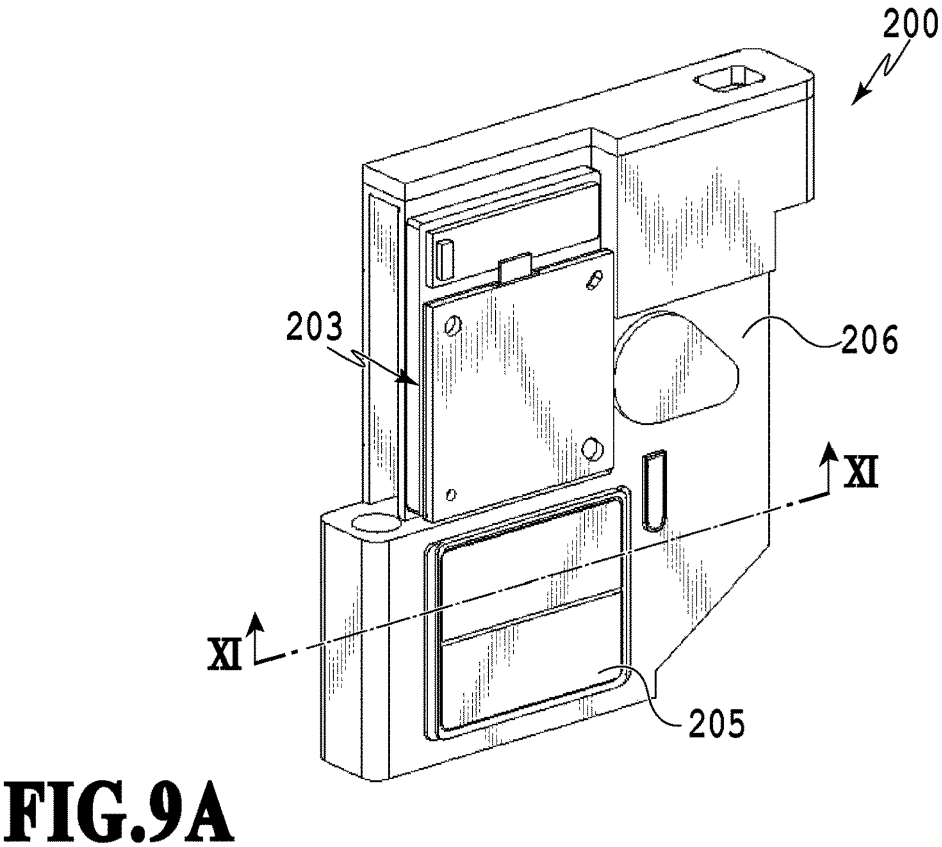
FIGS. 9A and 9B are perspective views illustrating a circulation unit in the second embodiment.
Figure 9B:
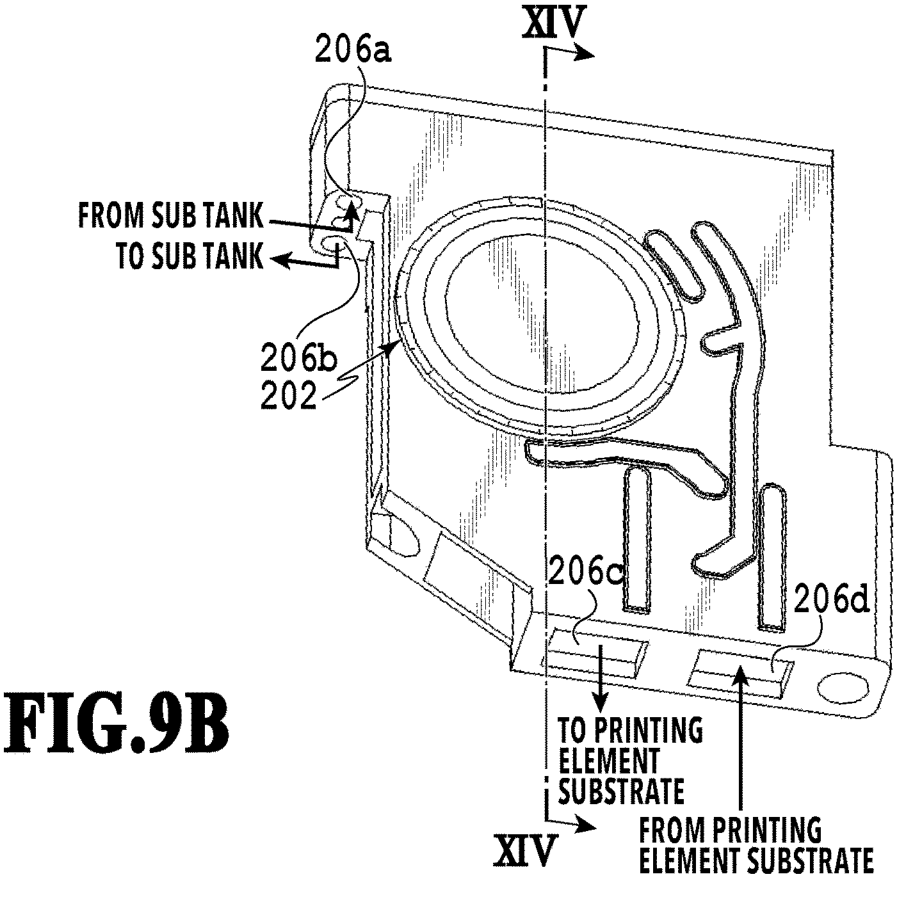

FIGS. 9A and 9B are perspective views illustrating an exterior appearance of a specific configuration example of the circulation unit 200 for one color. The circulation unit 200 includes the pressure regulator 202 and the switching valves 205 mounted in the body 206 in which the ink flow channels are provided and the head circulation pump 203 attached to the body 206. In this embodiment, the pressure regulator 202 and the switching valves 205 are integral with the body 206 for cost reduction. Likewise the head circulation pump 203, it is also possible to attach the pressure regulator 202 and the switching valves 205 to the body 206 as a separate unit. In this case, there is an advantage that it is possible to commonly use the units regardless of the shape of the body 206.

As illustrated in FIG. 9B, a joint hole 206*a* through which the ink is received from the sub tank 2001 and a joint hole 206*b* through which the ink is returned to the sub tank 2001 are provided on an upper portion of the body 206. A hole 206*c* through which the ink is supplied to the printing element substrate 10 by way of the support member 11 and a hole 206*d* through which the ink is collected from the printing element substrate 10 are provided on a lower portion of the body 206.

Figure 10A:
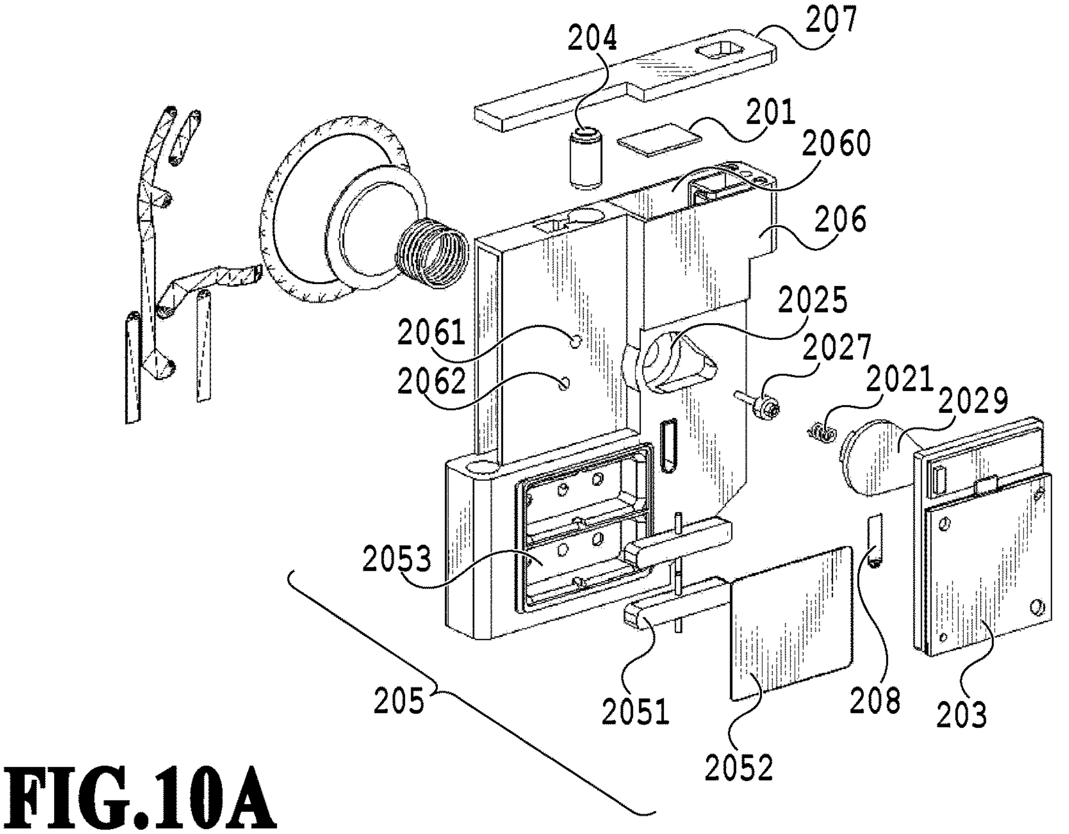
FIGS. 10A and 10B are exploded perspective views of the circulation unit illustrated in FIGS. 9A and 9B.
Figure 10B:
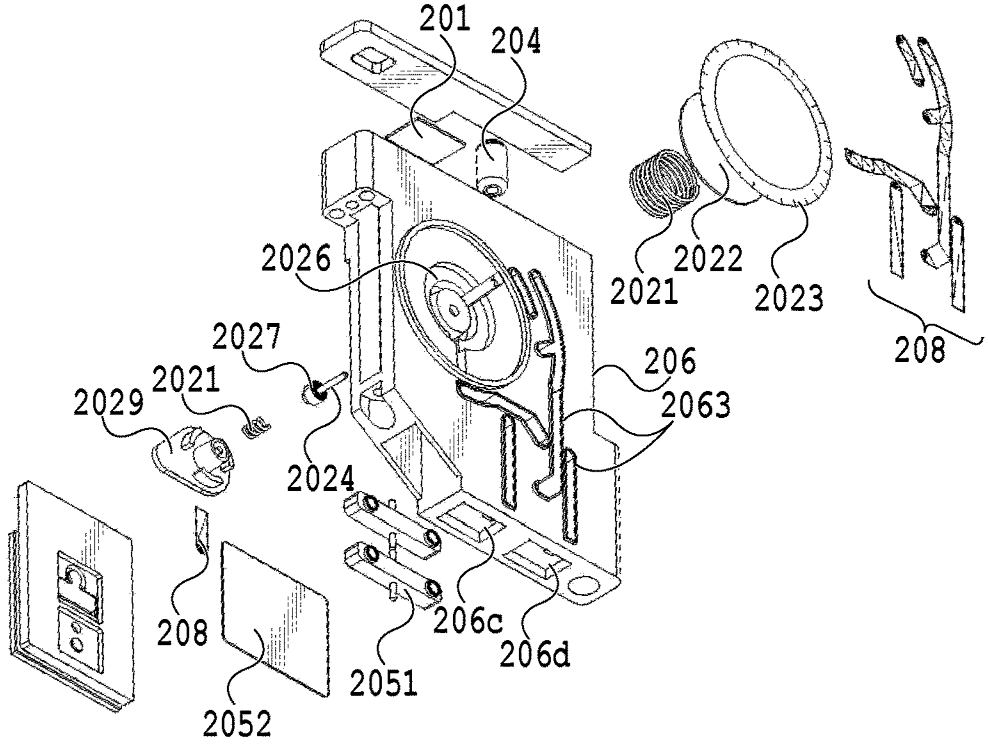

FIGS. 10A and 10B are exploded views of the circulation unit 200. In FIG. 10A, a filter chamber 2060 is provided in the upper portion of the body 206, and the filter 201 is inserted in and welded to the filter chamber 2060. The negative pressure compensation valve 204 is inserted next to the filter chamber 2060. A lower portion of the negative pressure compensation valve 204 communicates with a pump supply port 2061 inside the body 206. A flow channel structure inside the body 206 is described later.

The pressure control valve 2027, the biasing member 2021, and a spring holder 2029 are inserted in this lamination order into the supply chamber 2025 provided on a side surface of the body 206. The biasing member 2021 is compressed to a designed length between the pressure control valve 2027 and the spring holder 2029 to apply certain biasing force to the pressure control valve 2027. The spring holder 2029 has a function as a lid of the supply chamber 2025 in addition to a function as a fixing member to fix the biasing member 2021 and is welded or joined to the body 206.

Two switching chambers 2053 are provided in a lower portion of the side surface of the body 206, and rocker valves 2051 are inserted in the switching chambers 2053, respectively. With a flexible film 2052 joined to the body 206 and the two rocker valves 2051 so as to cover the entirety of the switching chambers 2053 by a method such as adhering or welding, the switching valves 205 are formed. A structure and a switching operation of the switching valves 205 are described later.

In FIG. 10B, the negative pressure chamber 2026 is formed on an opposite surface side of the supply chamber 2025 in the body 206. The biasing member 2021, the pressure reception plate 2022, and the flexible film 2023 are inserted in this lamination order into this negative pressure chamber 2026. The biasing member 2021 is compressed to a designed length between a bottom portion of the negative pressure chamber 2026 and the pressure reception plate 2022 to apply a certain load to the pressure reception plate 2022. The flexible film 2023 is welded or joined to the body 206. This flexible film serves as a lid of the negative pressure chamber 2026 while deforming without inhibiting the movement of the pressure reception plate 2022. Additionally, a flow channel in the form of a groove is formed in the body 206 in terms of production such as molding, and thus a sealing film 208 is adhered or welded to the body 206 so as to cover an opening portion of the flow channel in a step of assembling the circulation unit 200.

(Switching Valve)

Figure 11A:
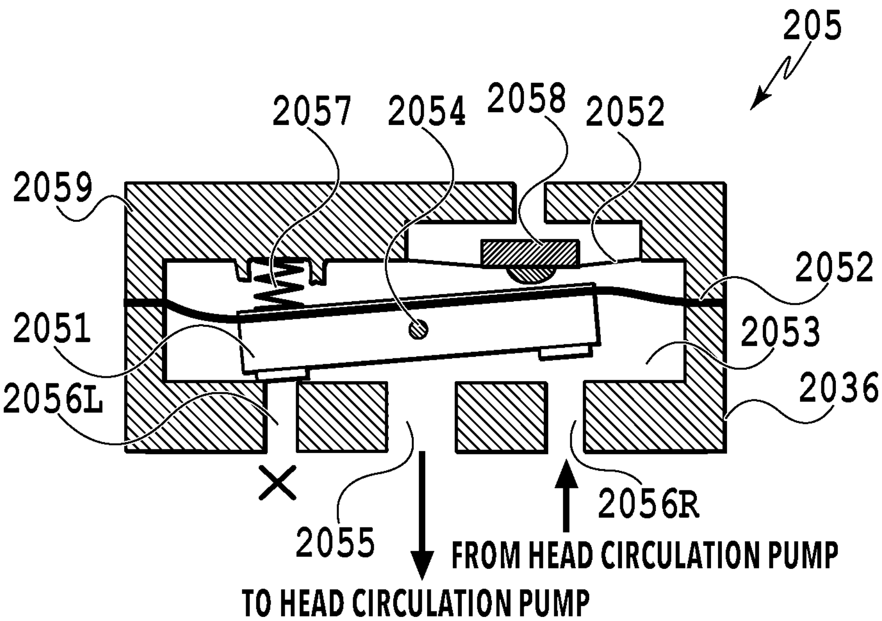
FIGS. 11A and 11B are diagrams schematically illustrating a cross section of a switching valve.
Figure 11B:
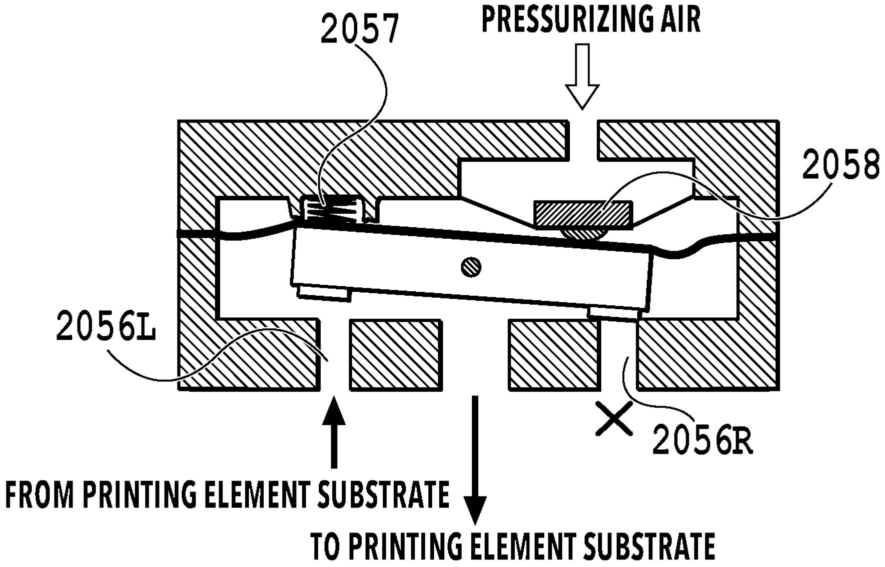

FIGS. 11A and 11B are diagrams schematically illustrating a cross section of the switching valve 205 taken along the line XI-XI in FIG. 9A. The rocker valve 2051 is inserted in the switching chamber 2053 provided in a housing 2036 while being pivotable about a rotation axis 2054. The flexible film 2052 is welded to the rocker valve 2051. An end portion of this flexible film 2052 is welded to a peripheral edge portion of the switching chamber 2053 to seal the switching chamber 2053. Additionally, a cover 2059 is attached to the housing 2036 so as to cover the flexible film 2052. A biasing member 2057 that biases a portion near one end portion of the rocker valve 2051 is attached to an inner surface (surface facing the film) of the cover 2059. Additionally, a pressing member 2058 provided to be capable of pressing or distancing a portion near the other end portion of the rocker valve 2051 is attached to the inner surface of the cover 2059 with the flexible film 2052 arranged therebetween. In FIG. 10A, the biasing member 2057, the pressing member 2058, and the cover 2059 are not illustrated.

In this embodiment, a three-way valve of a so-called rocker valve type is used as the switching valve 205. As illustrated in FIGS. 11A and 11B, rotative force about the rotation axis 2054 is generated in the rocker valve 2051 according to the biasing force of the biasing member 2057. Therefore, the rocker valve 2051 closes an opening and closing port 2056L while opening the other opening and closing port 2056R. In this case, if the pressing member 2058 is pressed downward by pressurizing air so as to exceed the biasing force of the biasing member 2057 as illustrated in FIG. 11B, the rocker valve 2051 closes the opening and closing port 2056R while opening the other opening and closing port 2056L. Thus, it is possible to switch the communication relationship between a common port 2055 provided in the center of the switching chamber 2053 and the opening and closing port 2056L or 2056R depending on the position of the rocker valve 2051.

In this embodiment, pneumatic driving is applied as the method of driving the rocker valve 2051; however, it is not limited thereto, and another driving method may be applied. For example, it is also possible to preferably use a mechanic mechanism using a magnet coil and a motor.

Other than the rocker valve 2051, it is also possible to form a three-way valve by using multiple direct-acting type pressure control valves 2027. In this case, the ink is pressed out and sucked in association with the opening and closing operation of the pressure control valves 2027; thus, a pressure change is caused in the in-head flow channel, and this may affect on the meniscuses of the ejection ports 103. If the state of the meniscuses is changed, the volume of ejected droplets is changed. Therefore, if the amount of change is great, there is a risk of a density difference on the printed image which causes degradation of the image quality. In order to suppress this risk, it may be considered to significantly reduce the strokes of the valves or to dispose a large buffer chamber. However, in this case, there can be a disadvantage that a strong circulation pump is required because the flow resistance in the valve unit is increased, or the size of the circulation unit 200 is increased.

On the other hand, in a case where the rocker valve 2051 is used like this embodiment, the ink is pressed out and sucked concurrently during the switching operation; thus, a change in the negative pressure is small, and the effect on the meniscuses in the ejection ports 103 can be suppressed. Note that, even in the case of applying the rocker valve 2051, there can be a case in which the pressure change during the opening and closing cannot be sufficiently suppressed in a single switching chamber because the rotation axis 2054 of the rocker valve 2051 does not necessarily be provided centrally symmetric due to a design restriction of a spring and the like for opening and closing the valve. However, in this embodiment, as illustrated in FIG. 5, the switching valves 205 are arranged on the upstream side and the downstream side of the ejection ports 103, respectively. Therefore, the volume change during the switching between the two switching chambers 2053 can be compensated for by using the switching valves 205 having the same shape and arranged such that the valve elements are moved in opposite phases. Consequently, the negative pressure change in the in-head circulation flow channel (first circulation flow channel) during the switching operation can be sufficiently reduced.

(Head Circulation Pump)

Figure 12A:
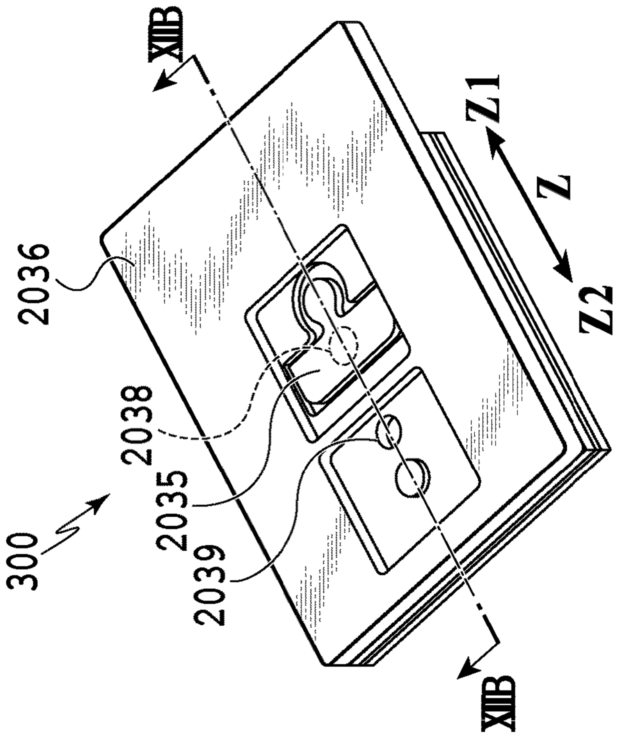
FIGS. 12A and 12B are a perspective view and a cross-sectional view of a head circulation pump illustrated in FIGS. 10A and 10B.

FIG. 12A is a diagram illustrating an exterior appearance of the head circulation pump 203. In this embodiment, a piezoelectric type diaphragm pump is used as the head circulation pump 203. In general, the piezoelectric diaphragm pump has characteristics that a smaller number of parts, smaller and lighter, quieter, and smaller pressure pulsation than that of the motor type diaphragm pump. Therefore, it can be said that the piezoelectric diaphragm pump is suitable to be mounted in the printing head 1. However, the piezoelectric diaphragm pump has problems that, since the displacement amount of a diaphragm 2031 is small, it is difficult to make the pump self-priming, and an amount of transferred liquid is decreased if a lot of bubbles are mixed therein.

Figure 16A:
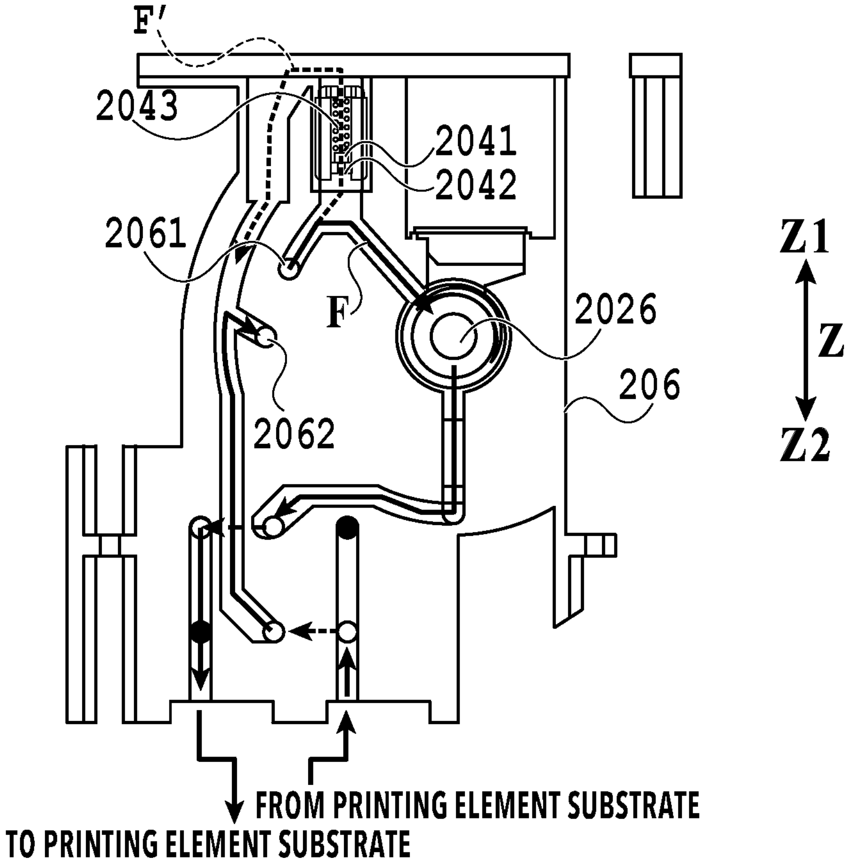
FIGS. 16A and 16B are cross-sectional views taken along the line XVI-XVI in FIG. 14.

In terms of the above, in the circulation unit 200, an in-head circulatory flow F turns downward (Z2 direction) in a vertical direction (Z direction) before entering a pump collection port 2062, as illustrated in FIG. 16A. With this configuration, bubbles discharged from the printing element substrate 10 are guided to be accumulated in an upper portion of the circulation unit 200 to be prevented from flowing into the head circulation pump 203.

As illustrated in FIG. 12A, the discharge port 2038 and the suction port 2039 are provided in one surface of the head circulation pump 203. The discharge port 2038 and the suction port 2039 communicate with the pump supply port 2061 and the pump collection port 2062 formed in the body 206 of the circulation unit 200, respectively. In this case, the discharge port 2038 is arranged above (Z1 direction) in the vertical direction (Z direction) the suction port 2039. This configuration is preferable because this facilitates the discharging of bubbles mixed in the head circulation pump 203, and the stable flow rate can be secured.

Another measure to suppress the entering of bubbles into the head circulation pump 203 may be to provide the filter 201 or a mesh in the pump collection port 2062 or in front or rear of the pump collection port 2062 as a bubble trap material. In this case, the mesh size and the area of the filter 201 need to be set properly in order to prevent an excessive pressure drop in the filter 201 and to trap bubbles of a size that affects the pump operation.

Figure 12B:
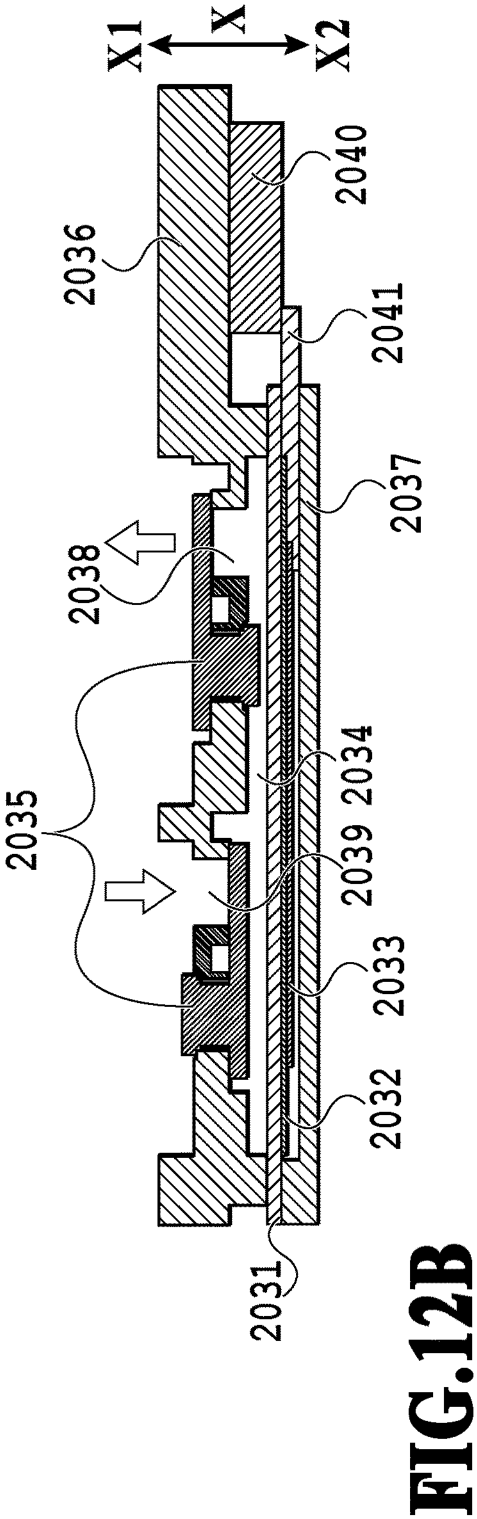

FIG. 12B is a cross-sectional view taken along the line XIIB-XIIB in FIG. 12A. In FIG. 12B, an open arrow indicates a flow direction of the ink. Two check valves 2035, a pump driving circuit 2040, and the diaphragm 2031 are attached to the housing 2036. An electrode plate 2032 and a piezoelectric element 2033 are joined to the diaphragm 2031.

The pump driving circuit 2040 is electrically connected to a main body control unit (not illustrated). The pump driving circuit 2040 includes a booster circuit built-in that generates a voltage required for driving the piezoelectric element 2033. The pump driving circuit 2040 is electrically connected to the piezoelectric element 2033 and the electrode plate 2032 through a TAB 2041 and is intended to be able to make a potential difference between the piezoelectric element 2033 and the electrode plate 2032 at a certain frequency based on a signal from the control unit. This potential difference causes displacement of the piezoelectric element 2033 in the vertical direction (X direction) in FIG. 12B, and the electrode plate 2032 and the diaphragm 2031 joined to the electrode plate 2032 are displaced accordingly. In a case where the diaphragm 2031 is displaced downward (X2 direction) in FIG. 12B, the check valve 2035 on the right side is opened and sucks the ink. In this process, the check valve 2035 on the left side is closed. On the other hand, in a case where the diaphragm 2031 is displaced upward (X1 direction) in FIG. 12B, the check valve 2035 on the left side is opened and discharges the ink. In this process, the check valve 2035 on the right side is closed.

In general, the displacement of the piezoelectric element 2033 is small and about several tens of μm; however, with this operation performed at several tens to several hundreds of Hz, a flow rate of about several mL/min to several tens of mL/min can be generated. Additionally, an ejection pressure or a suction pressure of the pump of about several kPa to several tens of kPa can be generated. The flow rate and the pressure can be adjusted based on the sizes of the piezoelectric element 2033 and a pump chamber 2034, the thicknesses of the piezoelectric element 2033, the electrode plate 2032, and the diaphragm 2031, a voltage/frequency provided to the piezoelectric element 2033, a driving waveform (sine curve or square wave), and the like.

For example, with a high voltage of several hundreds of V applied within a range equal to or less than a breakdown voltage between the piezoelectric element 2033 and the electrode plate 2032, the displacement amount of the piezoelectric element 2033 can be increased, and the pump flow rate and the pressure can be increased. Therefore, in terms of a measure for the high voltage, suppressing of ink adherence, and the like, a cover 2037 is joined to a position in which the piezoelectric element 2033 is covered in the structure illustrated in FIG. 12B. It is more preferable to provide the cover 2037 to a position in which the pump driving circuit 2040 is covered.

Figure 13A:
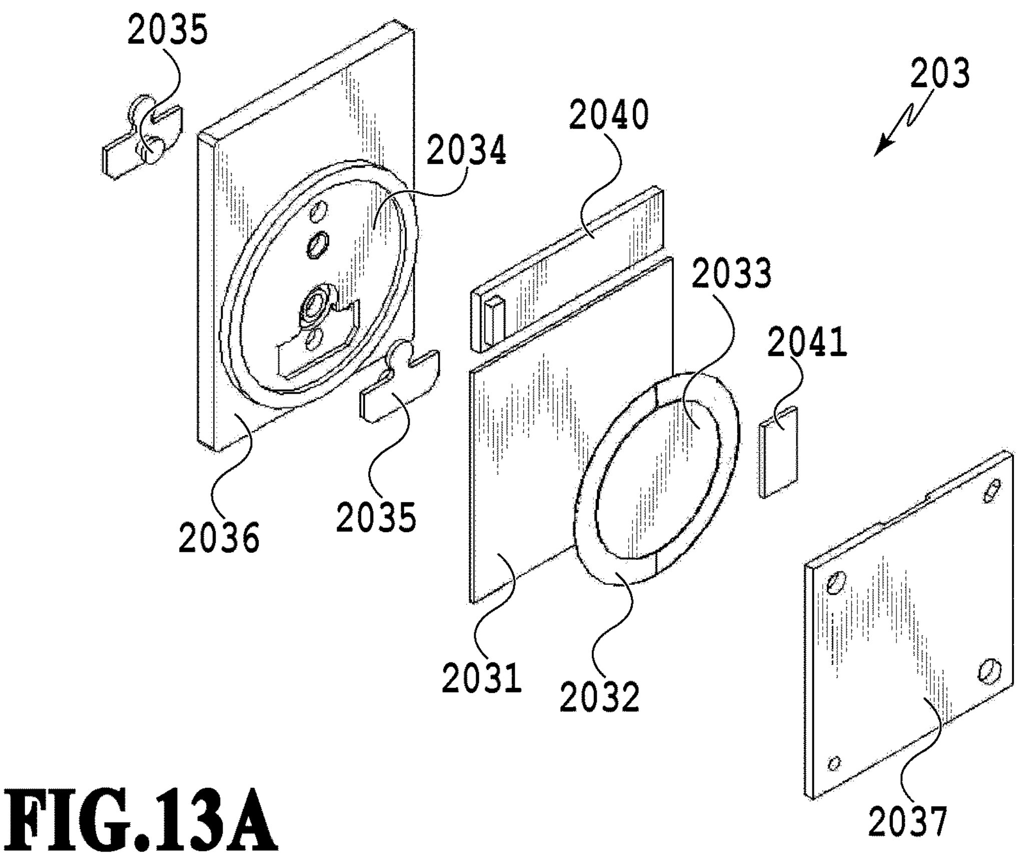
FIGS. 13A and 13B are exploded perspective views of the head circulation pump illustrated in FIGS. 12A and 12B.
Figure 13B:
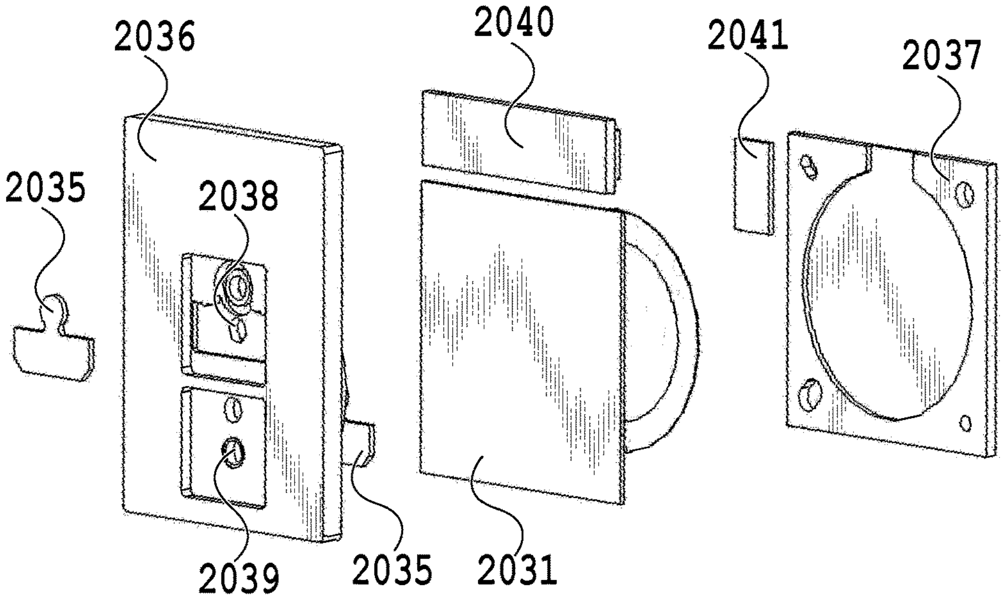

FIGS. 13A and 13B are exploded perspective views of the head circulation pump 203. As described above, the pair of check valves 2035 are attached to the housing 2036 such that the housing 2036 is arranged therebetween. In this embodiment, the check valves 2035 are fixed by inserting leg portions thereof into a hole in the housing 2036. The diaphragm 2031, the electrode plate 2032, and the piezoelectric element 2033 are joined to the pump chamber 2034 of the housing 2036 in this lamination order. It is preferable that the diaphragm 2031 has a chemical resistance to the ink and a stiffness that can follow the deformation of the piezoelectric element 2033. Therefore, resin such as, for example, PPS or PPE formed in a thickness of about 0.2 to 0.5 mm can be used as the diaphragm 2031. Additionally, the pump driving circuit 2040, the TAB 2041 that electrically connects the piezoelectric element 2033 and the electrode plate 2032 to the pump driving circuit 2040, and the cover 2037 are attached to the housing 2036. A lead wire, a solder, and the like can be substituted for the TAB 2041.

(Pressure Regulator)

Figure 14:
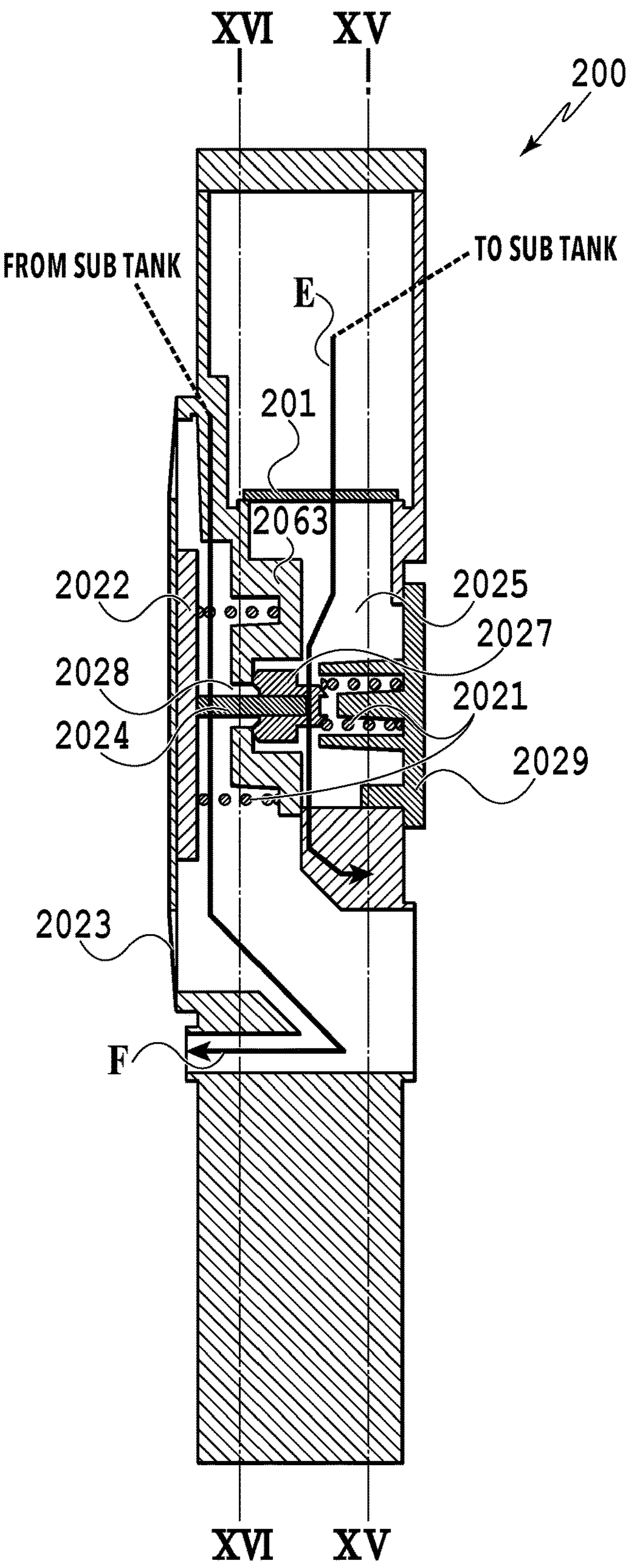
FIG. 14 is a cross-sectional view taken along the line XIV-XIV in the circulation unit illustrated in FIGS. 9A and 9B.

Details of a structure of and a pressure control operation by the pressure regulator 202 provided in the circulation unit 200 are described. FIG. 14 is a cross-sectional view taken along the line XIV-XIV in FIG. 9B. A general depressurizing type regulator is used as the pressure regulator 202 provided in this embodiment. The pressure regulator 202 includes the negative pressure chamber 2026 sealed by the flexible film (flexible member) 2023. The negative pressure chamber 2026 is formed between the flexible film 2023 including a peripheral portion joined to a surface of the body 206 and a wall portion 2063 of the body 206 covered by this flexible film 2023. The pressure reception plate 2022 is fixed to the inner surface of the flexible film 2023. The orifice 2028 is formed in a center portion of the wall portion 2063 covered by the flexible film 2023 so as to penetrate through the wall portion 2063. In the body 206, the supply chamber 2025 is formed in a position on the opposite side of the wall portion 2063 to the pressure reception plate 2022.

The pressure reception plate 2022 is biased in a direction in which the pressure reception plate 2022 is moved to the right side of FIG. 14 (that is, a direction in which the volume of the negative pressure chamber 2026 is increased) by the biasing member (spring) 2021 in the negative pressure chamber 2026. The pressure control valve 2027 capable of closing the orifice 2028 is provided in the supply chamber 2025. The shaft 2024 is fixed to the pressure control valve 2027, and one end of this shaft 2024 is able to be put in contact with the pressure reception plate 2022. These pressure control valve 2027, shaft 2024, and pressure reception plate 2022 are configured to be moved integrally during the head driving. The pressure control valve 2027 is biased in a direction in which the pressure control valve 2027 is moved to the right side of FIG. 14 (that is, a direction in which the pressure control valve 2027 closes the orifice 2028) by the biasing member (spring) 2021 in the supply chamber 2025.

The pressure control valve 2027 operates so as to change the flow resistance by changing a gap between the pressure control valve 2027 and the orifice 2028. To stop the circulation of the ink, the pressure control valve 2027 is put in contact with the orifice 2028 to close the gap and seals the orifice 2028 fluidically. It is preferable to use an elastic material such as rubber or elastomer having a sufficient corrosion resistance to the ink as the material of the pressure control valve 2027.

In FIG. 14, the pressure control valve 2027 is provided on the right side of the orifice 2028 such that the gap between the orifice 2028 and the pressure control valve 2027 is reduced while the pressure reception plate 2022 is moved leftward. A pressure of the ink flowing from the filter 201 into the supply chamber 2025 during the printing operation is reduced by a pressure drop in the gap portion between the pressure control valve 2027 and the orifice 2028 while the ink is passing through the gap, and then the ink flows into the negative pressure chamber 2026. Thereafter, the ink is supplied from the negative pressure chamber 2026 to the printing element substrate 10 by way of the switching valve 205 (see FIG. 5).

A pressure P2 in the negative pressure chamber 2026 is determined based on the following relational expression indicating a balance of the force applied to the constituents:

$$P2=P0-(P1Sv+k1x)/Sd \quad \text{(Expression 1), where}$$

Sd is a pressure reception area of the pressure reception plate, Sv is a pressure reception area of the pressure control valve, P0 is an atmospheric pressure, P1 is a pressure [Pa] in the supply chamber, P2 is a pressure in the negative pressure chamber, k1 is a combined spring constant of the biasing member, and x is a spring displacement.

The second term on the right-hand side of Expression 1 is always a positive value, and thus the pressure P2< the pressure P0 is obtained, while the pressure P2 is a negative pressure.

The pressure P2 can be set to a desired control pressure by changing the force of the biasing member 2021. In order to change the force of the biasing member 2021, a spring constant K or a spring free length is changed.

The following expression is obtained, where the flow resistance in the gap portion between the pressure control valve 2027 and the orifice 2028 is R, and the flow rate passing through the orifice 2028 is Q:

$$P2=P1-QR \quad \text{(Expression 2).}$$

Figure 17:
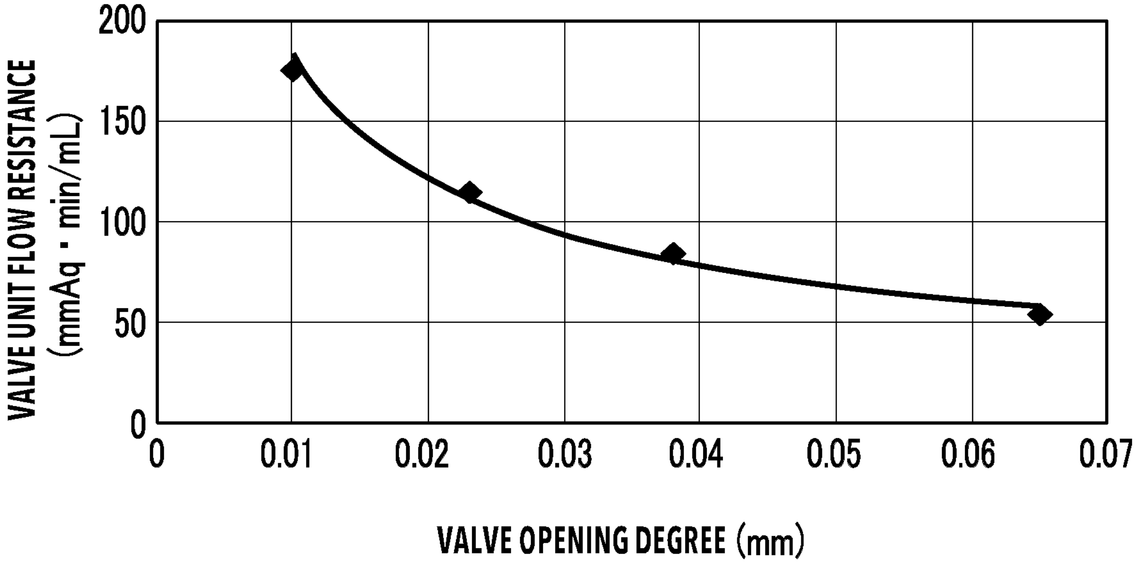
FIG. 17 is a diagram indicating a relationship between a flow resistance in a valve unit and a valve opening degree of a pressure regulator.

In this case, the flow resistance R and the gap (hereinafter, referred to as a "valve opening degree") between the valve and the orifice 2028 are designed to have a relationship as indicated in FIG. 17, for example. That is, as the valve opening degree is increased, the flow resistance R is reduced. The pressure P2 is determined with the valve opening degree determined such that (Expression 1) and (Expression 2) are satisfied concurrently.

If the ejection flow rate is changed during the printing operation, and the flow rate Q is instantaneously increased, an ink flow rate based on this change is supplied from the supply chamber 2025 to the negative pressure chamber 2026. Therefore, a flow resistance in the collection tube 1002 is reduced, and accordingly a load in the supply pump 1003 is reduced. As a result, the pressure P1 in the supply chamber 2025 is reduced, and thus the force P1Sv trying to close the pressure control valve 2027 is reduced, while the pressure P2 is instantaneously increased according to (Expression 1).

Additionally, R=(P1−P2)/Q is derived according to (Expression 2). In this case, the flow rate Q and the pressure P2 are increased, and the pressure P1 is reduced; thus, the flow resistance R is reduced. Once R is reduced, the valve opening degree is increased according to the relationship illustrated in FIG. 17. As can be seen in FIG. 14, since the length of the biasing member (spring) 2021 is decreased if the valve opening degree is increased, x that is a displacement from the free length is increased. Accordingly, acting force k1x of the spring is increased. Therefore, the pressure P2 is instantaneously reduced according to (Expression 1). On the other hand, if the flow rate Q is reduced, and the pressure P1 is instantaneously increased, P2 is instantaneously reduced by action opposite of the above. With these operations instantaneously repeated, the valve opening degree is changed according to the flow rate Q, while (Expression 1) and (Expression 2) are both satisfied, and consequently the pressure P2 in the negative pressure chamber 2026 is controlled autonomously to be constant.

In the case where the pressure P1 is reduced, R is reduced to make the pressure P2 constant as can be seen in (Expression 2). That is, the valve opening degree is increased. However, as can be seen in FIG. 17, even in the case where the valve opening degree is increased, a flow resistance R that is below a flow resistance equal to or below a certain value (≈flow resistance of the orifice 2028) cannot be obtained. For this reason, in order to allow the pressure regulator 202 to stably control the pressure P2 to be constant, P1 equal to or greater than a certain value needs to be continuously applied to the supply chamber 2025. Therefore, the capabilities of the supply pump 1003, the pressure drops in the supply tube 1001 and the filter 201, an open valve pressure in the differential pressure valve 2004, and the like need to be designed based on the maximum ejection flow rate in the printing head 1 and the minimum operation pressure in the pressure regulator 202.

In this embodiment, the spring as the biasing member 2021 is two coupling springs. The following preferable adventitious effects are obtained by adopting the configuration of the two coupling springs like this embodiment.

That is, the pressure reception plate 2022 and the shaft 2024 are configured to be separated from each other in the negative pressure chamber 2026. Additionally, the configuration allows the biasing force to be applied to the pressure reception plate 2022 in a direction in which an inner volume in the negative pressure chamber 2026 is increased by the spring in the negative pressure chamber 2026 even in the state where the pressure reception plate 2022 and the shaft 2024 are separated from each other. Therefore, even if bubbles in the flow channel of the printing head 1 are expanded due to a variation in the surrounding environment temperature, the amount of the inner volume increased by the bubbles can be absorbed by increasing the inner volume of the negative pressure chamber 2026, and thus it is possible to cause a predetermined negative pressure in the negative pressure chamber 2026. Consequently, leaking of the ink from the ejection port 103 can be suppressed.

However, as long as the spring has a spring force capable of satisfying a desired negative pressure value, no difficulty is caused in the pressure adjustment function. Therefore, a configuration in which only one spring is used or in which three or more springs are used may be applied.

(Negative Pressure Compensation Valve)

Figure 16B:
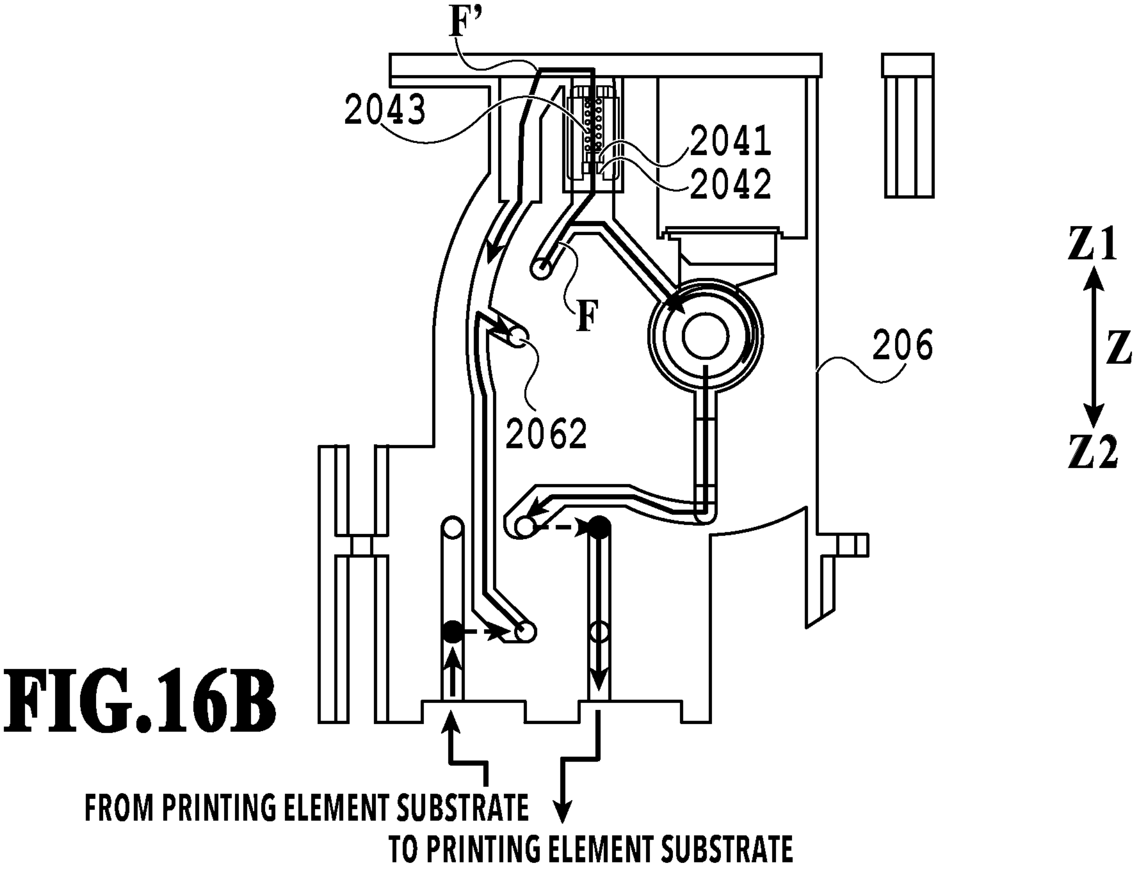

The negative pressure compensation valve 204 has a function of suppressing an increase in the negative pressure that occurs in the supply flow channel 105*a* or the collection flow channel 105*b* on the downstream side of the ejection ports 103 of the printing element substrate 10 to be equal to or below a certain value to maintain the image quality in a case where images with high printing duty are printed continuously. In this embodiment, a general differential pressure valve as illustrated in FIG. 16A is used as the negative pressure compensation valve 204. The negative pressure compensation valve 204 includes therein a pressure control valve 2041, an orifice 2042, and a biasing member (spring) 2043 that biases the pressure control valve 2041 to bring into contact with the orifice 2042. The pressure control valve 2041 is intended to be opened in a case where a differential pressure equal to or greater than a certain value between the upstream side and the downstream side of the negative pressure compensation valve 204 occurs, and a pressure in a direction in which the pressure control valve 2041 is opened becomes greater than the biasing force of the biasing member 2043. FIG. 16A illustrates a state where the pressure control valve 2041 is closed, while FIG. 16B illustrates a state where the pressure control valve 2041 is opened. A valve opening pressure of the pressure control valve 2041 can be set to a desired value depending on the biasing force of the spring and the pressure reception area of the pressure control valve 2041.

Note that, since in general the flow resistance of the differential pressure valve is varied in accordance with an increase in the flow rate passing through the differential pressure valve, the differential pressure valve is not suitable to maintain the pressure on the downstream side of the differential pressure valve always in a certain range. In a case where the maximum ejection flow rate of the printing head 1 is relatively small, the differential pressure valve 2004 having a simple and small structure is suitable as the negative pressure compensation valve 204. However, for the printing head 1 having a relatively great maximum ejection flow rate, it is favorable to use a differential pressure valve that has the same structure as that of the pressure regulator 202 as the negative pressure compensation valve 204. In this case, there is a risk that the size of the circulation unit 200 becomes large.

(Flow of Ink in Circulation Unit)

Figure 15:
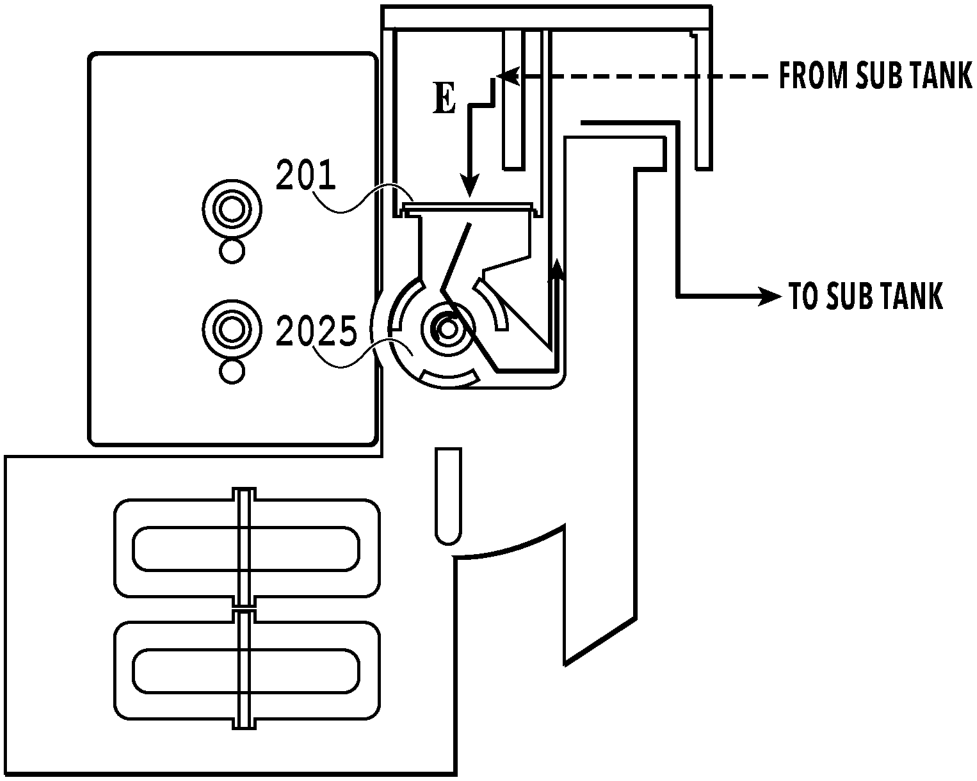
FIG. 15 is a cross-sectional view taken along the line XV-XV in FIG. 14.

In FIGS. 14 to 16A and 16B, the tank circulatory flow (second circulatory flow) E and the in-head circulatory flow (first circulatory flow) F generated in the circulation unit 200 of this embodiment are indicated by arrows. FIG. 14 is a cross-sectional view taken along the line XIV-XIV in FIG. 9B, FIG. 15 is a cross-sectional view taken along the line XV-XV in FIG. 14, and FIGS. 16A and 16B are cross-sectional views taken along the line XVI-XVI in FIG. 14. For the sake of simplifying the descriptions, the communication states of the communication ports with the switching chambers 2053 are schematically indicated by a white circle and a black circle in FIGS. 16A and 16B. That is, the white circle indicates a state where the communication port is opened by the rocker valve 2051, while the black circle indicates a state where the communication port is closed by the rocker valve 2051, respectively.

In FIGS. 14 and 15, the tank circulatory flow (first circulatory flow) indicated by the arrow E passes through the filter 201, flows into the supply chamber 2025, passes through peripheries around the pressure control valve 2027 and the biasing member 2021, and then is refluxed again from the circulation unit 200 to the sub tank 2001. Therefore, even in the printing standby state, the ink flow suppresses the precipitation of the color material between the sub tank 2001 and the supply chamber 2025 and between the supply chamber 2025 and the sub tank 2001.

The pressure variation associated with the ink oscillation in the supply tube 1001 and/or collection tube 1002 that occurs during the high-speed printing is attenuated according to the ratio (S1/S2) of the pressure reception area of the pressure control valve 2027 (S1) and the pressure reception area of the pressure reception plate 2022 (S2), as described above. In the configuration illustrated in FIG. 14, this ratio is 3% or less, and the negative pressure variation that occurs on the tank circulatory flow side is attenuated to be sufficiently small in the in-head circulatory flow. Therefore, in the printing apparatus 1000 of this embodiment, it is possible to perform printing with high image quality at high-speed with no streaks and unevenness.

The in-head circulatory flow indicated by the arrow F in FIGS. 16A and 16B flows into the negative pressure chamber 2026 from the pump supply port 2061 by way of the flow channel in the body 206 by driving the head circulation pump 203. Then, after passing between the pressure reception plate 2022 and the orifice 2028, the in-head circulatory flow flows to the outside of the circulation unit 200 by way of the switching valves 205. Thereafter, as illustrated in FIG. 5, the in-head circulatory flow passes through the support member 11 and the printing element substrate 10 and is refluxed again to the circulation unit 200. Then, the in-head circulatory flow passes through the switching valves 205 again and returns to the pump collection port 2062.

In FIG. 16A, the configuration allows the in-head circulatory flow to flow from the upper side (Z1) to the lower side (Z2) in the vertical direction (Z direction) of the negative pressure chamber 2026, and this is an example for achieving a size reduction of the circulation unit 200. Since the precipitated color material is accumulated on the lower side in the vertical direction, it is preferable in a case of reducing the time for solving the precipitation to adopt a configuration in which the in-head circulatory flow flows from the lower side to the upper side in the vertical direction of the negative pressure chamber 2026.

FIG. 16B illustrates a state where the rocker valve 2051 is operated, and the communication state of the communication ports with the switching chambers 2053 is opposite of that in FIG. 16A. With the communication state of the communication ports switched as described above, a flow in the opposite direction can be generated in the printing element substrate 10 as illustrated in FIG. 6 while maintaining the in-head circulatory flow F.

In the state illustrated in FIG. 16A, the negative pressure compensation valve 204 is closed, and no ink flows in a portion indicated by a broken line arrow F'. Therefore, there is a risk that the colorant precipitation may occur in this region. If the colorant precipitation in this portion affects on the image quality, the pressure in the pump collection port 2062 is reduced by increasing the flow rate in the head circulation pump 203. Consequently, the negative pressure compensation valve 204 is opened, a branch flow F' branched from the in-head circulatory flow F is formed, and the precipitation of the color material is suppressed.

In FIG. 16A, since it is in the printing standby state, the pressure control valve 2027 is put in contact with the orifice 2028, and the tank circulatory flow E and the in-head circulatory flow F are circulatory flows that are independent from each other. In this case, the in-head circulatory flow F flows in a negative pressure state that is started from the slightly negative pressure caused in the negative pressure chamber 2026. The tank circulatory flow E flows in the supply chamber 2025 at a higher pressure than that of the in-head circulatory flow. It is preferable to set the flow rate of the tank circulatory flow E to be greater than the maximum ejection flow rates of the in-head circulatory flow F and the printing head 1 such that the flow from the circulation unit 200 to the sub tank 2001 does not stop.

Once the printing is started, and the ink volume in the region of the in-head circulatory flow is reduced, the pressure control valve 2027 is opened, and a branch flow from the tank circulatory flow E to the in-head circulatory flow F is generated. In this case, although there is a pressure difference between the tank circulatory flow and the in-head circulatory flow, the negative pressure suitable for the ejection in the in-head circulatory flow is stably maintained due to a difference in the pressure drops due to the gap between the orifice 2028 and the pressure control valve 2027.

As described above, the printing apparatus 1000 in this embodiment can perform printing with high image quality at high-speed, and even with the ink that easily precipitates such as a white ink, the execution of the recovery operation can be drastically reduced by the precipitation suppression action of the circulations. Therefore, it is possible to reduce the amount of waste inks and downtime caused by the recovery operation.

COMPARATIVE EXAMPLE

Figure 18:
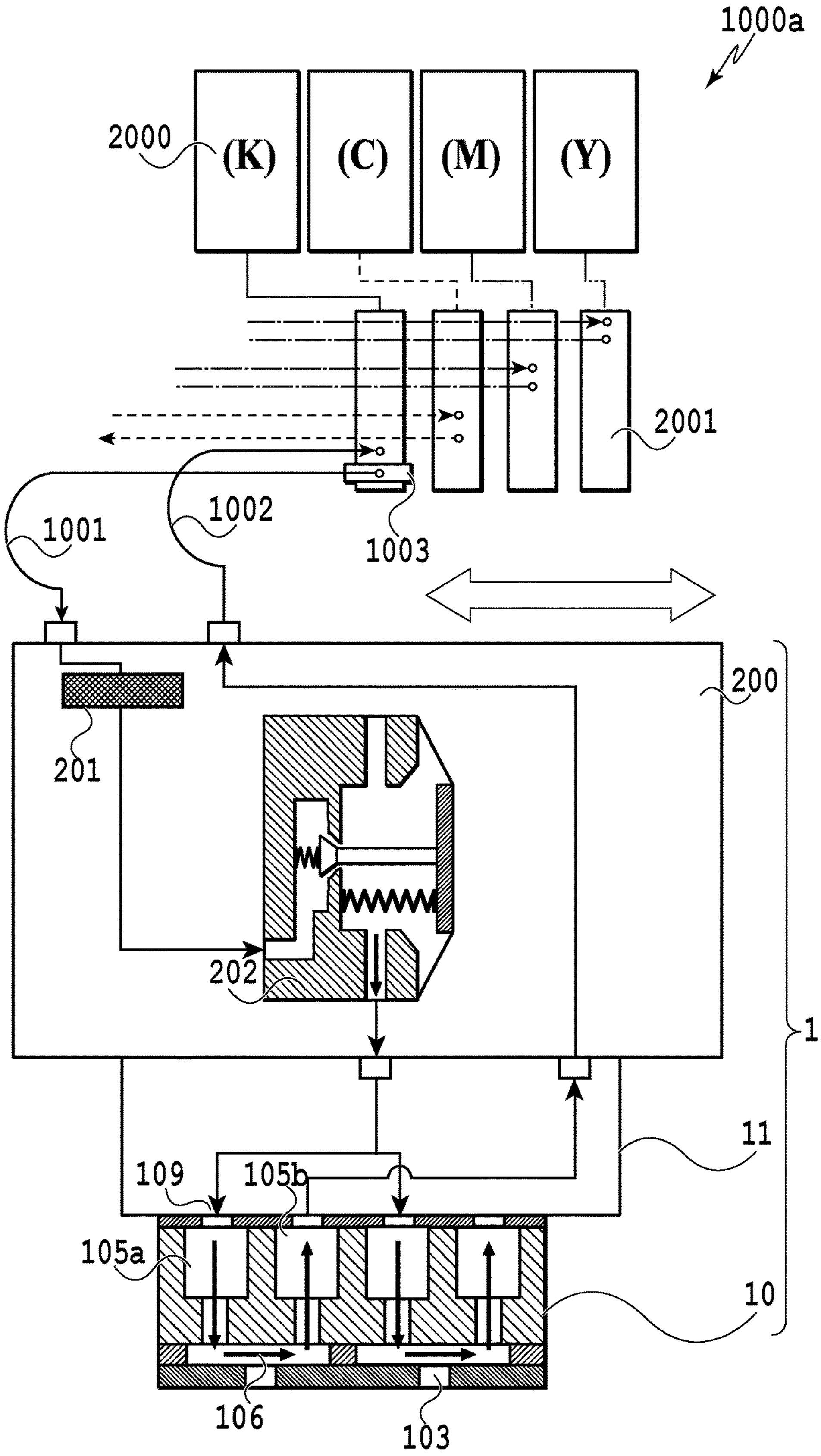
FIG. 18 is a schematic view illustrating a schematic configuration of a liquid ejection apparatus in a comparative example.

FIG. 18 is a schematic view that illustrates a printing head and an ink channele of the inkjet printing apparatus 1000*a* in a comparative example of this embodiment. This comparative example is different from the above-described first embodiment in that there is formed a circulation flow channel in which the ink passes through the inside of the printing element substrate 10 and circulates between the sub tank 2001 and the printing head 1 by the driving force of the supply pump 1003. That is, in the comparative example, a circulation flow channel in which the ink supplied from the sub tank 2001 to the pressure regulator 202 through the supply tube 1001 passes through the printing element substrate 10 and then returns again to the sub tank 2001 by way of the collection tube 1002 is formed. Thus, the comparative example has a configuration in which a circulatory flow passing through the sub tank and the printing head is formed, and therefore the precipitation of the color material in the flow channel is suppressed.

However, in the comparative example, the ink circulation is performed in the single circulation flow channel. For this reason, if the ink in the supply tube 1001 and the collection tube 1002 is oscillated due to the reciprocal scanning of the head during the printing operation, there arises a new problem that the pressure variation of the ink that occurs due to the oscillation is transmitted to the inside of the printing element substrate 10. That is, in the configuration of the comparative example, the pressure variation from the supply tube 1001 is reduced by the pressure regulator 202, but the pressure variation from the collection tube 1002 side is transmitted to the pressure chamber 106 without reduction. This causes a problem that the ejected amount and the ejection properties of the printing head become unstable, streaks and unevenness are generated on the printed image, and thus the image quality is degraded. This problem becomes prominent as the scanning speed of the printing head is increased. Thus, in the comparative example, although it is possible to suppress the precipitation of the color material, there arises the new problem of the degradation of the image quality and the productivity.

On the other hand, according to the printing apparatus of the present embodiment, it is possible to suppress the precipitation of the color material in the flow channel without degrading the image quality and the productivity.

Other Embodiments

In the above embodiments, a serial type printing apparatus that allows for the reciprocal scanning of the printing head while performing the printing is taken as an example to give the descriptions; however, the present invention is not limited thereto. The present invention is also effective for a so-called full-line type printing apparatus that includes a long printing head in which multiple printing elements are arrayed in a range corresponding to a page width. In the full-line type printing apparatus, the printing head does not move in the printing operation; thus, no negative pressure variation due to the oscillation of the tube coupling the liquid storing unit and the printing head occurs like the serial-type printing apparatus. However, since the amount of the circulatory flow required to suppress the precipitation of the color material is increased according to the size of the printing head, a pulsation of the circulation pump is likely to be increased, and the image quality is likely to be degraded. The present invention has a configuration that forms the two circulatory flows in which pressures are separated from each other by the pressure control unit; thus, if the present invention is applied to the the full-line type printing apparatus, it is possible to suppress the transmission of the pulsation of the circulation pump to the printing head. Therefore, printing with high image quality at high-speed while suppressing a colorant precipitation can be achieved.

In the above embodiments, there are described a liquid ejection head that ejects liquid by heat energy generated by a heating element and a liquid ejection apparatus that uses the liquid ejection head. However, the present invention is also applicable to a liquid ejection head that ejects liquid by an electromechanical transduction element (piezoelectric element) and a liquid ejection apparatus that uses the liquid ejection head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-106019 filed Jun. 19, 2020, which is hereby incorporated by reference wherein in its entirety.

What is claimed is:

1. A liquid ejection head configured to perform a reciprocal moving along a predetermined direction, comprising:

a liquid ejection unit including an ejection port capable of ejecting liquid;

a pressure control unit that receives the liquid from a liquid storing unit provided outside the liquid ejection head, and is capable of supplying the liquid whose pressure is controlled within a predetermined pressure range to the liquid ejection unit; and a circulation unit configured to supply the liquid whose pressure is controlled by the pressure control unit to the ejection port while circulating the liquid between the liquid ejection unit and the pressure control unit;

wherein the pressure control unit includes, a supply chamber configured to receive the liquid from the liquid storing unit;

a negative pressure chamber that communicates with the liquid ejection unit through the circulation unit; and a pressure control valve configured to control a communication state between the supply chamber and the negative pressure chamber according to a pressure difference between the supply chamber and the negative pressure chamber, wherein in a case where the pressure control valve is closed, a circulatory flow between the liquid ejection unit and the negative pressure chamber is separated from a flow between the liquid storing unit and the supply chamber.

2. The liquid ejection head according to claim 1, wherein the pressure control valve is provided to be able to move forward and backward with respect to an orifice that allows for the communication between the supply chamber and the negative pressure chamber and changes a gap between the orifice and the pressure control valve according to the pressure difference between the supply chamber and the negative pressure chamber.

3. The liquid ejection head according to claim 2, wherein the negative pressure chamber includes a pressure reception plate displaceable according to a pressure inside the negative pressure chamber, and the pressure reception plate applies a pressing pressure to press the pressure control valve in a direction in which the pressure control valve is separated away from the orifice to the pressure control valve.

4. The liquid ejection head according to claim 3, wherein the pressure control valve is biased in a direction in which the orifice is closed by biasing force of a biasing unit and changes the gap by means of net force of the biasing force and the pressing pressure of the pressure reception plate.

5. The liquid ejection head according to claim 3, wherein a part of the negative pressure chamber is formed of a flexible member that is displaced according to the pressure in the negative pressure chamber, and the pressure reception plate is displaced along with the flexible member.

6. The liquid ejection head according to claim 4, wherein the biasing unit includes a spring and the pressure reception plate applies the pressing pressure to the pressure control valve via the spring.

7. The liquid ejection head according to claim 1, wherein the circulation unit includes a circulation flow channel that allows the liquid to circulate between the negative pressure chamber and the liquid ejection unit and a pump that allows the liquid to flow through the circulation flow channel.

8. The liquid ejection head according to claim 7, wherein the pump is a piezoelectric type diaphragm pump.

9. The liquid ejection head according to claim 1, wherein the circulation unit forms a circulatory flow that passes through a pressure chamber that generates a pressure to eject the liquid from the ejection port of the liquid ejection unit.

10. The liquid ejection head according to claim 1, wherein the circulation unit forms a circulatory flow that does not pass through a pressure chamber that generates a pressure to eject the liquid from the ejection port of the liquid ejection unit.

11. The liquid ejection head according to claim 1, wherein the circulation unit includes a negative pressure compensation unit that compensates for a pressure in the liquid ejection unit by supplying the liquid to the liquid ejection unit in a case where a pressure on a downstream side of the liquid ejection unit becomes lower than a certain pressure.

12. The liquid ejection head according to claim 11, wherein the circulation unit causes a flow rate at which the liquid is circulated in a printing standby state to be greater than a flow rate at which the liquid is circulated in a printing operation state.

13. The liquid ejection head according to claim 1, wherein the circulation unit and the pressure control unit are integrally provided.

14. The liquid ejection head according to claim 1, wherein the liquid ejection unit includes a heating element for ejecting the liquid.

15. The liquid ejection head according to claim 1, wherein the pressure control unit includes a filter provided in a flow channel supplying the liquid from the liquid storing unit.

16. The liquid ejection head according to claim 1, further comprising a bypass flow channel being capable of circulating liquid without passing through the pressure chamber communicating with the ejection port.

17. The liquid ejection head according to claim 1, wherein the liquid is an ink.

18. The liquid ejection head according to claim 1, wherein the liquid ejection head is configured to eject multiple colors of inks.

19. The liquid ejection head according to claim 18, wherein the multiple colors of inks include a white ink.

20. A liquid ejection apparatus comprising:

the liquid ejection head according to claim 1, and a moving unit configured to move the liquid ejection head reciprocally.

* * * * *